US009688166B2

(12) United States Patent
Ruthinowski et al.

(10) Patent No.: US 9,688,166 B2
(45) Date of Patent: Jun. 27, 2017

(54) ROTATABLE ANCHORS PROVIDING ENHANCED CHILD RESTRAINT SYSTEM INTERFACE ACCESSIBILITY

(71) Applicant: Ford Global Technologies, LLC, Dearborn, MI (US)

(72) Inventors: Richard Edward Ruthinowski, Taylor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/856,636

(22) Filed: Sep. 17, 2015

(65) Prior Publication Data
US 2017/0080830 A1    Mar. 23, 2017

(51) Int. Cl.
*B60N 2/26* (2006.01)
*B60N 2/28* (2006.01)

(52) U.S. Cl.
CPC .................. *B60N 2/2887* (2013.01)

(58) Field of Classification Search
CPC ................................... B60N 2/2887
USPC ......................................... 297/253
See application file for complete search history.

(56) References Cited

U.S. PATENT DOCUMENTS

| | | | | |
|---|---|---|---|---|
| 5,918,934 A * | 7/1999 | Siegrist | ................ | B60N 2/2821 297/253 X |
| 6,082,818 A * | 7/2000 | Muller | ..................... | B60N 2/28 297/253 X |
| 6,390,560 B1 * | 5/2002 | Gandhi | .................. | B60N 2/289 297/253 |
| 6,601,917 B1 | 8/2003 | Christopherson | | |
| 7,281,763 B1 | 10/2007 | Hayashi et al. | | |
| 7,338,121 B1 * | 3/2008 | Pilcher | ................. | B60N 2/0232 297/253 |

(Continued)

FOREIGN PATENT DOCUMENTS

JP    2010023695    2/2010

OTHER PUBLICATIONS

Craig Dilouie, Occupancy Sensors: Passive Infrared, Ultrasonic and Dual-Technology, Sep. 2008, Faculty Maintenance Decisions.

*Primary Examiner* — Rodney B White
(74) *Attorney, Agent, or Firm* — LeClairRyan

(57) ABSTRACT

A system and method for articulating a vehicle child restraint anchor to which a child restraint seat (CRS) is attachable is disclosed, wherein one or more anchors individually or jointly articulate between at least a first and a second position about a pivotal axis, that axis and related hardware generally contained within a vehicle seat assembly or attached to a vehicle floor, package tray or alternative load bearing support structure located behind or above a vehicle seat such as a roof. One or more anchor positions may be fixable. The system may be operated manually or semi-automatically, incorporate springs and interlocks, and may be sensor or motor/solenoid-driven. Articulated anchor positions may include a position of enhanced visibility and accessibility to simplify consumer CRS to child restraint anchor connectivity or disengagement compared to alternative positions of generally limited anchor accessibility, partial or total concealment, stowed, alternative or secondary anchorage use positions.

17 Claims, 23 Drawing Sheets

(56) References Cited

U.S. PATENT DOCUMENTS

| | | | |
|---|---|---|---|
| 7,533,934 B2 * | 5/2009 | Foelster | B60N 2/2893 |
| | | | 297/253 |
| 7,699,396 B2 | 4/2010 | Ghisoni et al. | |
| 7,722,105 B2 | 5/2010 | Shellhammer | |
| 7,758,096 B2 | 7/2010 | Ohta | |
| 8,678,497 B2 | 3/2014 | Kyogoku et al. | |
| 2002/0104190 A1 | 8/2002 | Moore et al. | |
| 2005/0046251 A1 * | 3/2005 | Foelster | B60N 2/2893 |
| | | | 297/253 |
| 2006/0267321 A1 | 11/2006 | Harish et al. | |
| 2007/0192007 A1 | 8/2007 | Stanley et al. | |
| 2009/0234542 A1 | 9/2009 | Orlewski | |
| 2016/0257229 A1 * | 9/2016 | Ruthinowski | B60N 2/5833 |

* cited by examiner

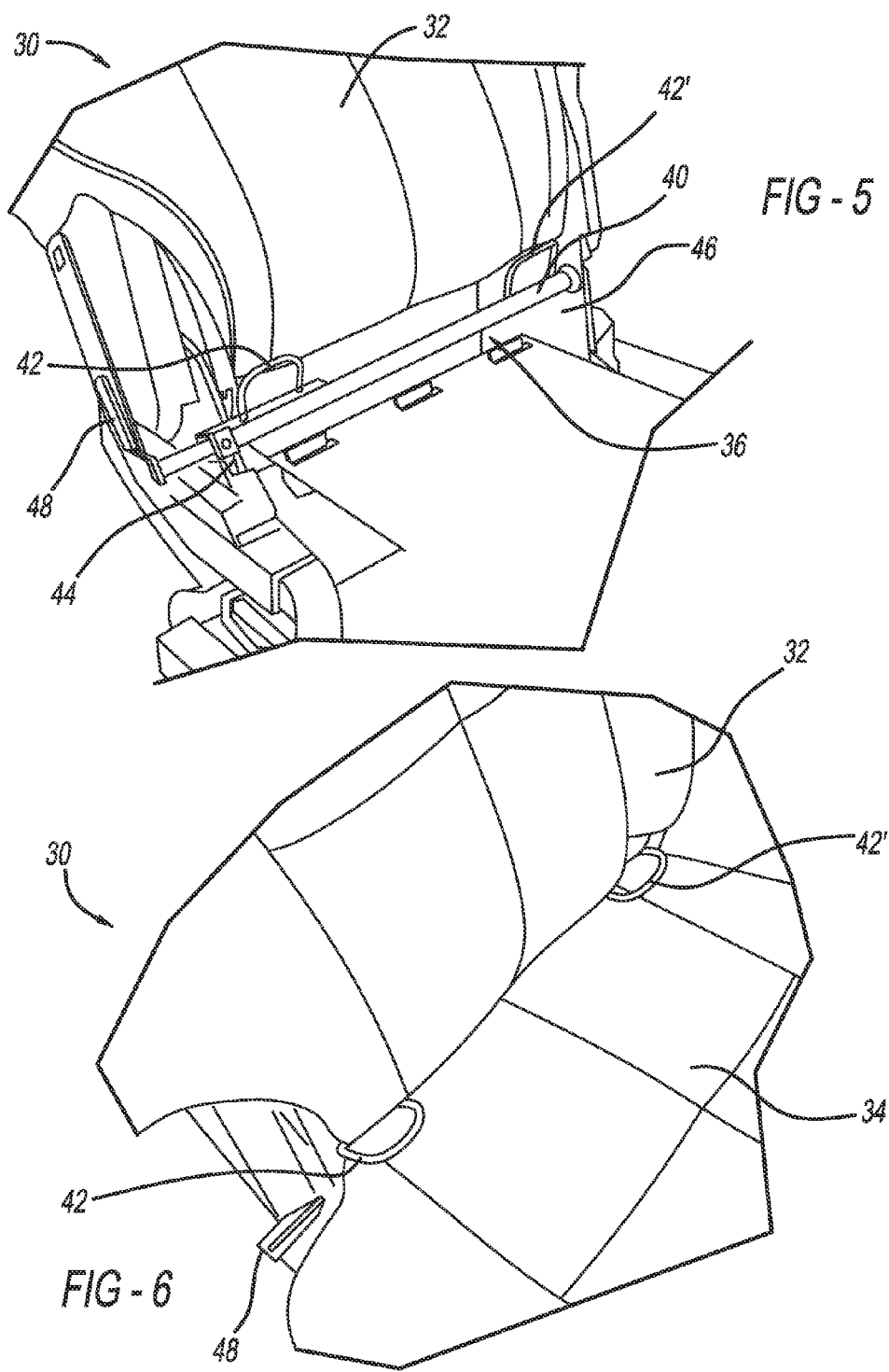

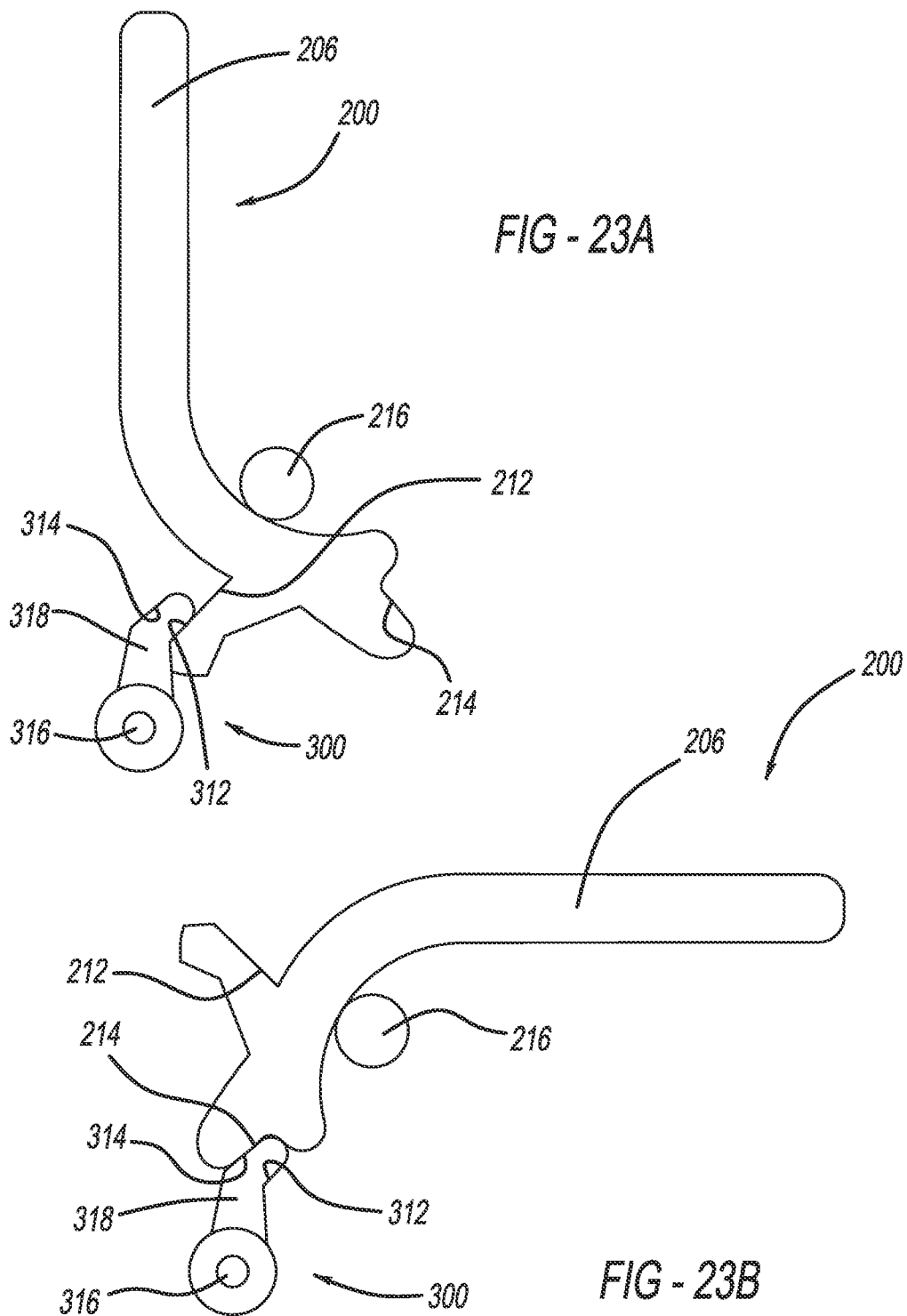

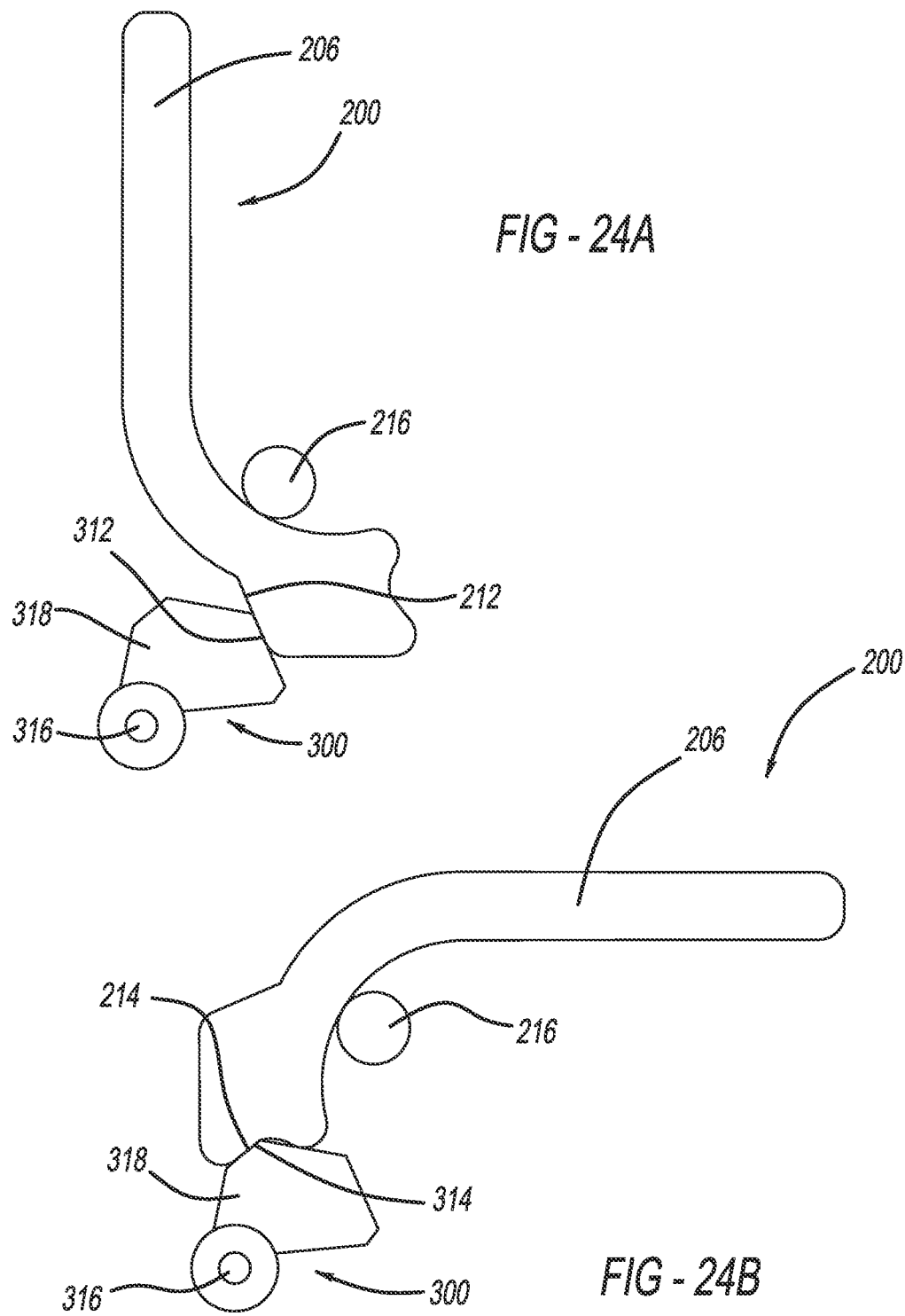

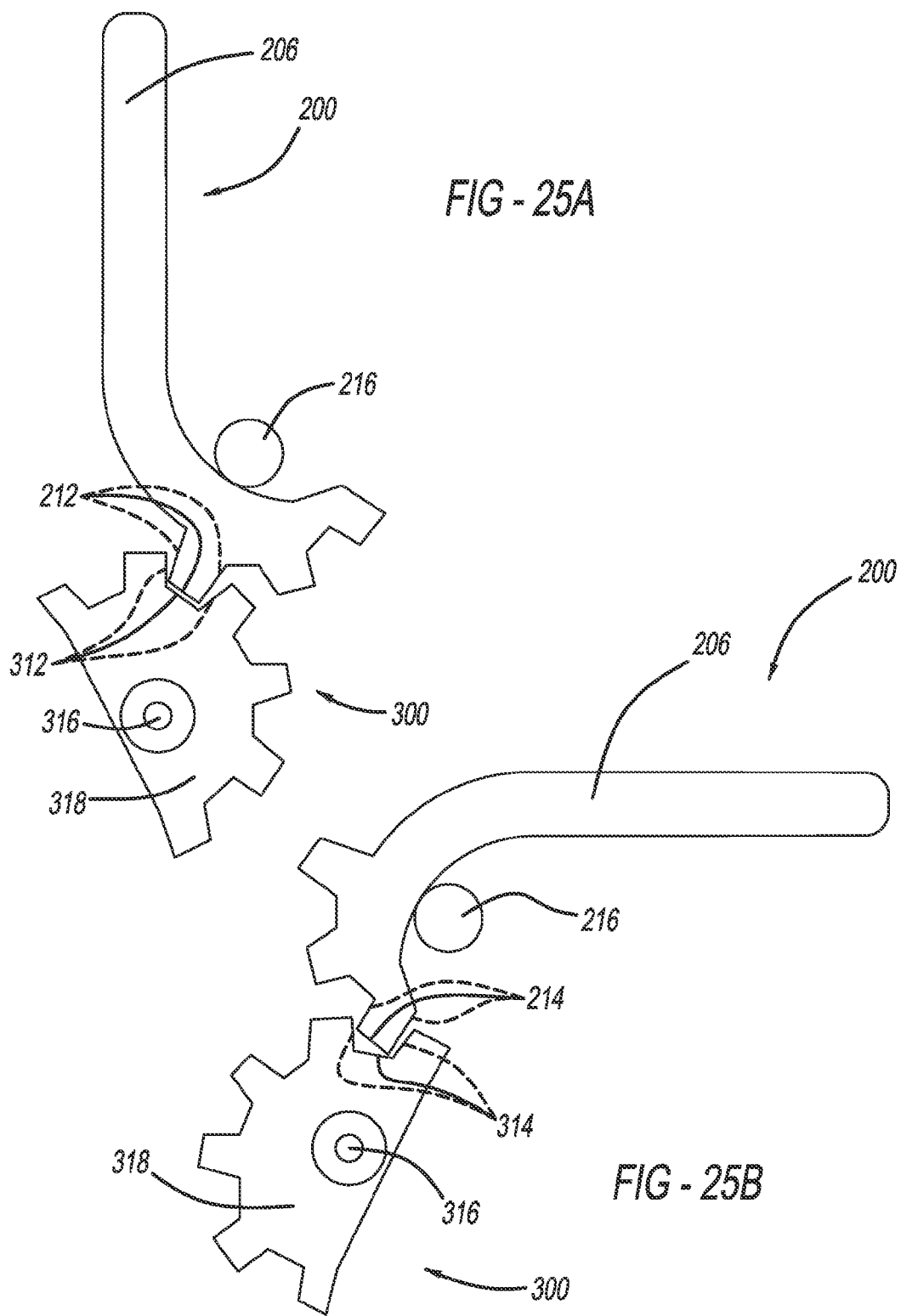

ROTATABLE ANCHORS PROVIDING ENHANCED CHILD RESTRAINT SYSTEM INTERFACE ACCESSIBILITY

TECHNICAL FIELD

The disclosed inventive concept relates to a method and system for improving accessibility to child restraint anchors incorporated in various types of transportation vehicles. The disclosed inventive concept involves one or more anchors that maintain a structural connection to a fixed or rotatable member, the anchor(s) permitted to articulate about a rotational axis from an initial position to a position of enhanced anchor accessibility. The system may include one or more actuators.

BACKGROUND OF THE INVENTION

Child Restraint Systems (CRS) are used in a variety of global markets and modes of public and private transportation such as personal automobiles, multipurpose passenger vehicles, school buses and airplanes. Further, various regional guidelines specify acceptable anchorage placement zones and that children of certain ages should be seated in Child Restraint Systems (CRS) or in a booster seat when traveling in an automobile. For example, the National Highway Traffic Safety Administration provides age, height and weight-based recommendations for front, rear facing and boosted child seat usage configurations for children in automobiles.

CRS anchors are often hidden from view or are not readily accessible in a variety of transportation vehicle installations. While a child anchor identification symbol (such as a tag, button or cover) is often located in close proximity to aid vehicle users in identifying the approximate anchor locations, accessibility is nonetheless often limited as an anchor may be located behind or underneath foam and trim that must be displaced to see and provide access to the anchor for CRS installation or removal.

Such anchor conditions increase the difficulty of CRS installation and removal due to limited visibility and hand clearance to an anchor that may be recessed below a trim surface or sandwiched snugly between the foam of a seat cushion and/or a seat back, seat or interior trim, a seat frame or a vehicle structure. Disconnecting a CRS can be especially challenging when attempting to release a secure spring clip engagement from a child seat attachment mechanism hook without being able to see, or having finger access clearance to, a vehicle anchor to which a child seat is tightly cinched. In some markets, points are given for CRS anchorage accessibility/installation ease when rating the vehicle safety characteristics.

Accordingly, a practical solution to enhance CRS anchor accessibility and ease of use in today's motor vehicle is provided. It may also be desirable to provide a means of stowing an otherwise prominently visible anchor (or anchors) out of view to enhance an occupant's comfort or interior appearance when an anchor or anchors are not utilized for attaching a CRS, or to provide an alternative location for secondary anchor usage conditions.

SUMMARY OF THE INVENTION

The disclosed inventive concept provides a means of articulating one or more anchors between a position of enhanced accessibility for customer CRS connectivity/disengagement and a position of generally limited anchor accessibility, anchor concealment or secondary anchor use. Particularly, the disclosed inventive concept provides a solution in which vehicle child restraint anchors have at least a first position and a second position, one or both of the positions may be fixable. At least one of the first and second positions complies with market-specific anchor placement zone requirements where applicable. In addition, at least one position provides enhanced visibility/accessibility for the purposes of simplifying consumer child restraint anchor access, compared to the other position. The enhanced accessibility position may correspondingly improve the likelihood of correct consumer CRS installation.

One or more anchors of the disclosed inventive concept are configured to rotate between the first position and the second position about a pivotal axis, that axis and related hardware being generally contained within a vehicle seat assembly or attached to the floor of a vehicle structure, to a package tray or support structure located behind or above a vehicle seat such as a roof, etc. One or both of these anchor positions may represent an acceptable "travel-ready" usage position (or zone compliant, where applicable) position for an installed CRS. If one position is provided only for enhanced accessibility but not for general "travel-ready" use (for example, if that position does not reside within a specified anchor placement zone), the system could be configured to retract/return to and/or engage in a lockable, intended CRS "travel-ready" use position. The system may function such that the consumer interface requires an end user to manually disengage an anchor system from a first generally inaccessible or concealed anchor location by way of overcoming a predefined "return to home position" spring biased resistance by rotating an anchor engage-able with an interlock interfacing an actuator handle, or thru use of a position controlling motor, etc., to disengage from that first position in order to rotate to the second position of enhanced anchor accessibility for CRS connectivity or disengagement. The system may be operated manually or semi-automatically and incorporate springs and interfacing interlocks, or may be sensor or motor/solenoid-driven.

In particular, the child restraint anchor system of the disclosed inventive concept includes a transportation vehicle seat having a seat back and a seat base capable of supporting a CRS, an anchor assembly including one or more anchors to which the child seat may be attached, and one or more positional control and interlock assemblies (PCIA). An anchor is movable between enhanced and reduced accessibility positions. A variety of anchor types may be provided, such as a plate-like element incorporating an aperture or a wire or rod loop formed to provide an aperture for attaching a child seat or alternative retention strap. The anchor assembly may engage a PCIA when the anchor is moved to the enhanced accessibility position from a stowed position and disengage from a PCIA when the anchor is returned to its stowed position. Alternatively, the anchor assembly may engage a PCIA while oriented in a first limited accessibility anchor placement zone compliant position and disengage the PCIA to enable rotation of the anchor assembly to a second position where the anchor assembly may re-engage the same (or engage an additional) PCIA while an anchor is oriented in a second enhanced accessibility position. The second position may also be zone compliant or may serve only as an intermediate lockable or non-lockable, transient position to facilitate child seat attachment or disconnection before returning the anchor(s) to a lockable "travel-ready" use, zone compliant position.

An anchor-receiving pocket may be provided to house an anchor in a concealed, or limited accessibility position.

Concealing flaps may be provided to conceal anchors when in stowed or less accessible positions.

The anchor assembly includes at least a first PCIA engaging surface and the PCIA includes at least a first anchor assembly engaging surface. An anchor position is fix-able, or constrained from rotating in at least one direction, when the appropriate compatible PCIA and anchor assembly engaging surfaces are in contact with one another. A PCIA and an anchor assembly may each include a return spring to urge the respective assembly to a stowed/non-CRS use, alternative use, a more or less accessible anchor position, a zone compliant CRS "travel-ready" use position, etc. as appropriate.

Compared to a variety of signal based, motor/solenoid, gear box and drive shaft type linear anchor displacement concept systems, the disclosed inventive concept can be less complex, requiring fewer components with a minimal effect on packaging and vehicle interior spaciousness. The anchor system hardware depicted herein generally illustrates lower anchorages located near the interface between a vehicle seat cushion and seat back; the system shown being containable within the confines of a free-standing seat structure. The anchor system can alternatively be incorporated in combination with, or primarily mounted to, a vehicle structure for a variety of vehicle types. A benefit of articulating anchor system containment within a pre-existing seat structure package is maintaining the external seating package without affecting the seat profile or spacing between rows of seats, compared to solutions that may provide fore/aft linear anchor movement incorporating anchor displacement drive mechanisms that may protrude rearward from or beneath the rear of the seat, affecting external seat package size or roominess/spaciousness between seat rows. Solutions that increase external package size may affect fold flat seating packages and limit object placement when folded, whereas the disclosed inventive concept does not. Further, the disclosed anchor system can be adapted for incorporation in association with upper anchors positioned on a vehicle seatback or a structural member positioned behind or above a vehicle seat.

Externally mounted, linear translating anchors and other anchor displacement solutions may additionally require shielding from direct consumer or foreign object contact. Containment within a seat package, or effectively behind or under the seat foam as set forth herein, would generally not require the same package considerations, though shielding could be provided if desired.

The above advantages and other advantages and features will be readily apparent from the following detailed description of the preferred embodiments in combination with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is similar to that of FIG. 4 but shown without the seat base cushion in place to expose the position and orientation of the concealed anchors;

FIG. 6 is a view similar to that of FIG. 4 but illustrating a lower child anchors moved to enhanced accessibility positions;

FIG. 23A is a side view of a PCIA or actuator/release mechanism for use with the system and method of the disclosed inventive concept illustrated in a first position to prevent clockwise rotation of the anchor;

FIG. 23B is a view similar to that of FIG. 23A where the PCIA or actuator/release mechanism is illustrated in a second position to prevent counter-clockwise rotation of the anchor;

FIG. 24A is a side view of a PCIA or actuator/release mechanism for use with the system and method of the disclosed inventive concept illustrated in a first position to prevent clockwise rotation of the anchor;

FIG. 24B is a view similar to that of FIG. 24A where the PCIA or actuator/release mechanism is illustrated in a second position to prevent counter-clockwise rotation of the anchor;

FIG. 25A is a side view of a PCIA or actuator/release mechanism for use with the system and method of the disclosed inventive concept illustrated in a first position in a first operating condition;

FIG. 25B is a view similar to that of FIG. 25A where the PCIA or actuator/release mechanism is illustrated in a second position in a second operating condition.

DETAILED DESCRIPTION OF THE PREFERRED EMBODIMENT

Figure 1:
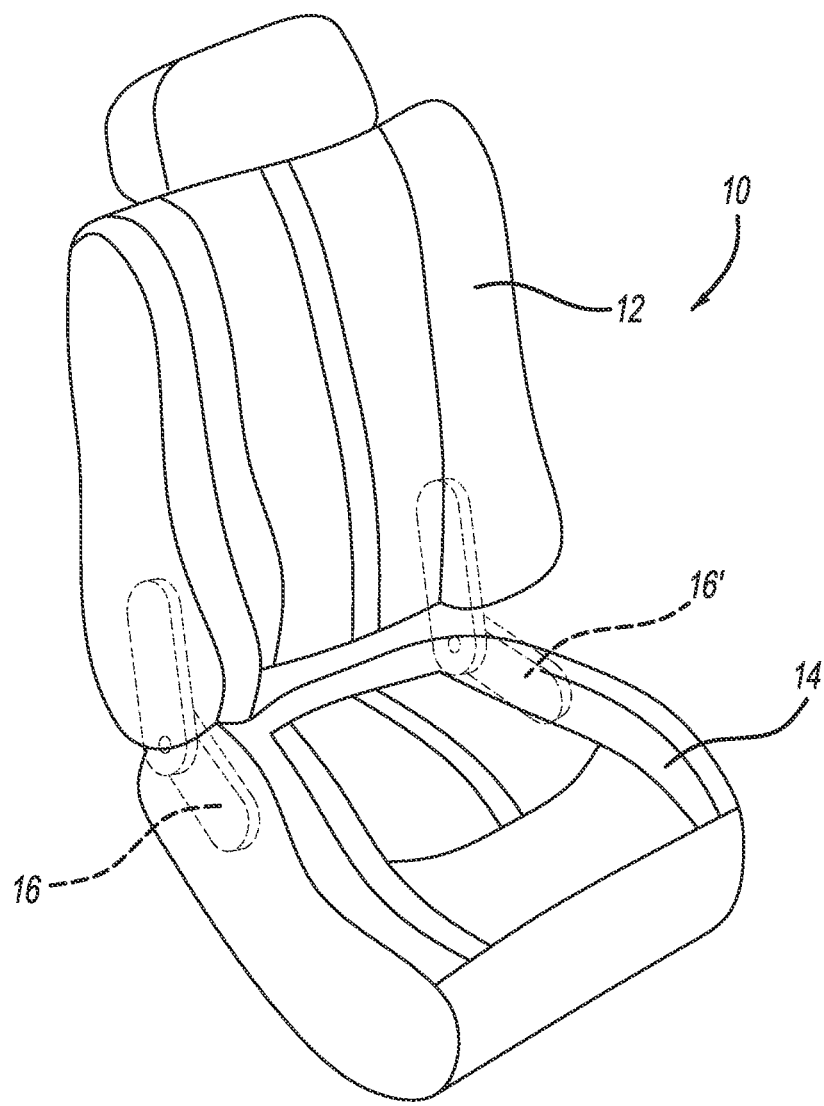
FIG. 1 is an isometric view of a portion of a vehicle seat having CRS anchors that are hidden by the vehicle seat back according to current technology.

In the following figures, the same reference numerals will often be used to refer to the same components. In the following description, various operating parameters and components are described for different constructed embodiments. These specific parameters and components are included as examples and are not meant to be limiting.

Figure 2:
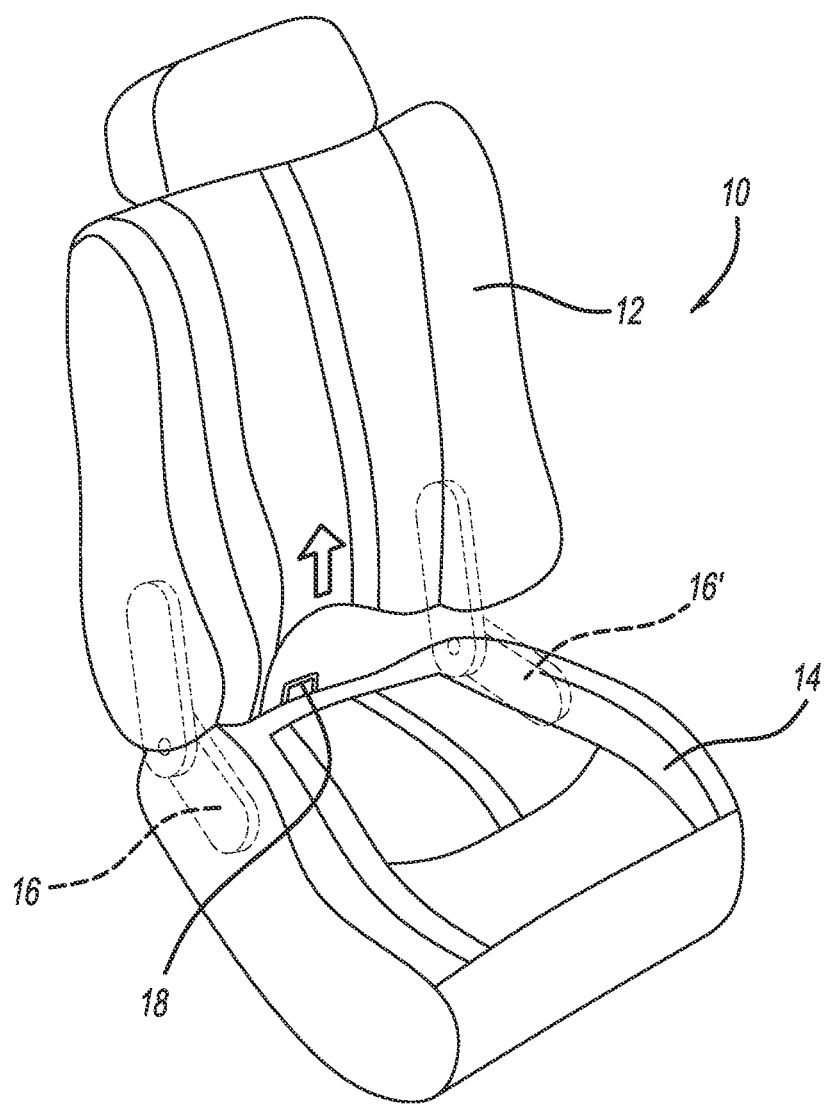
FIG. 2 is the view of FIG. 1 but showing the hand of an operator physically manipulating the vehicle seat back to access the CRS anchor according to current technology.
Figure 3:
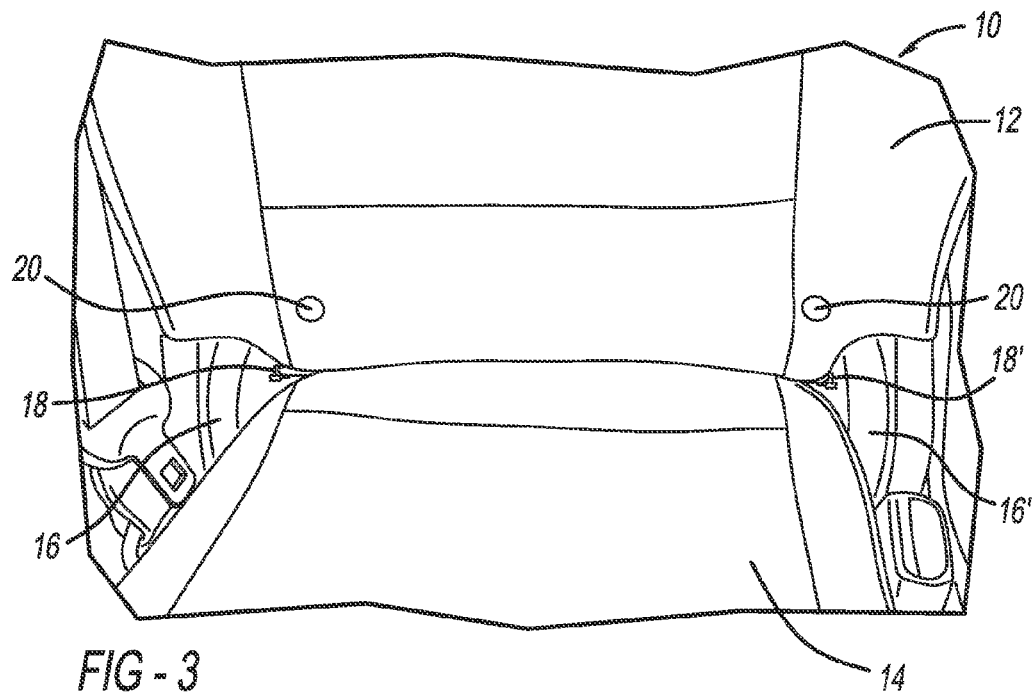
FIG. 3 is a front view of portion of a vehicle seat illustrating a view of partially exposed anchors according to current technology.

FIGS. 1, 2 and 3 illustrate an example of a known vehicle seat technology incorporating child restraint anchors concealed between a vehicle seat cushion and seat back. The illustrated seat package, generally illustrated as 10, is typical of known arrangements. The seat 10 includes a seat back 12 and a seat base 14. The seat back 12 and the seat base 14 may be joined by hinges 16 and 16' or may be jointly or individually affixed to the vehicle by other known methods.

Typical of a variety of known seat packages 10, a child restraint anchor 18 is purposely hidden from view in FIG. 1. Access to an anchor 18 is accomplished by physically displacing of a portion of the seat back 12, seat base 14, or both, to reveal and permit accessibility to an anchor 18 as illustrated in FIG. 2. In this figure, an arrow illustrates a portion of the seat back having been displaced to reveal the anchor 18. This is inconvenient for an end user. Known designs often present a challenge to connect and engage an interfacing CRS attachment clip (shown in later figures) to a concealed or recessed anchor 18. It can be an even greater challenge to disconnect and remove a child seat attachment clip from engagement with an anchor 18 as displacement of portions of seat back 12 or seat base 14 may be required to permit finger access to disengage a CRS attachment clip, made still more difficult by the presence of CRS tightened to the vehicle seat through connection with anchor 18. In FIG. 3, a pair of almost completely hidden child restraint anchors 18 and 18' are illustrated. In this example, a child seat installer must rely on a pair of "LATCH" symbols 20 and 20' attached to the lower portion of the front of the seat back 12 to identify the presence and location of anchors 18 and 18'.

Figure 4:
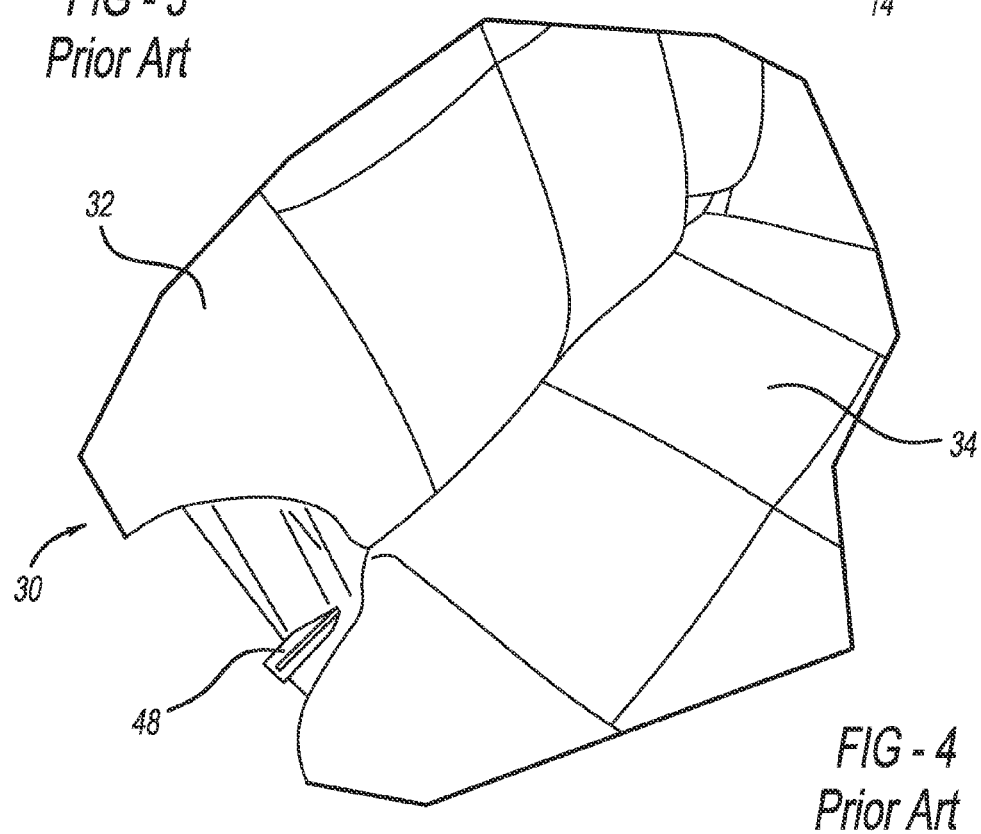
FIG. 4 is a perspective view of a portion of the intersection between a seat back and a seat base according to the disclosed inventive concept in which lower seat anchors are rotated to a position of concealment or storage.
Figure 7:
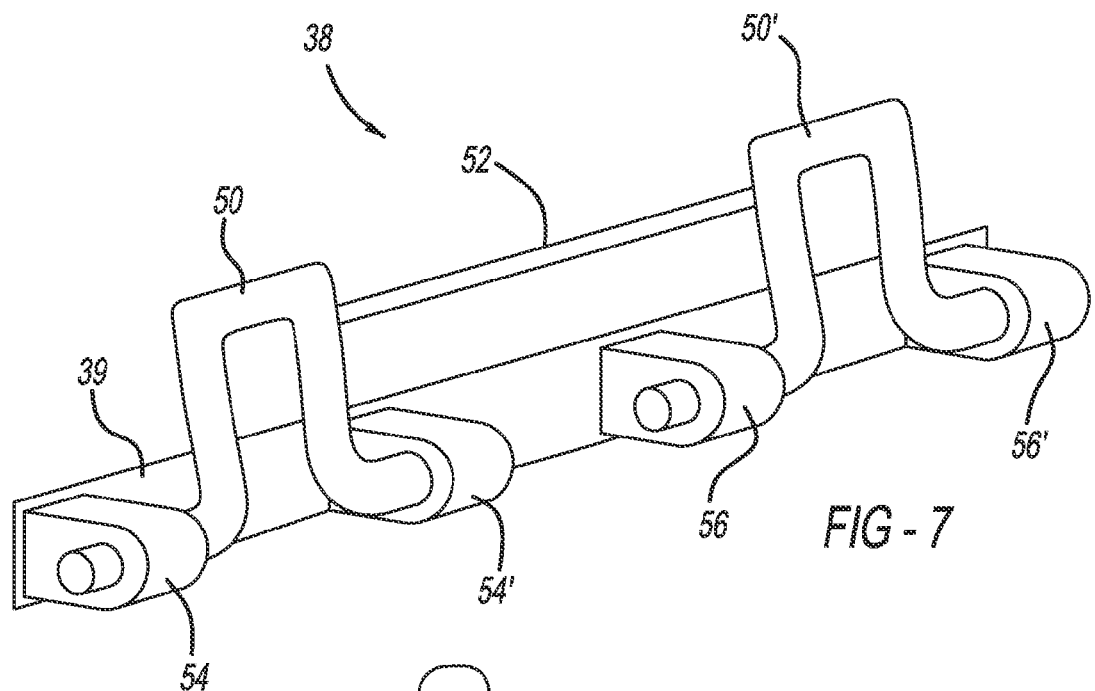
FIG. 7 is a perspective view of an example of a pair of anchor (loops) that are interconnected to facilitate simultaneous rotation between positions.
Figure 13:
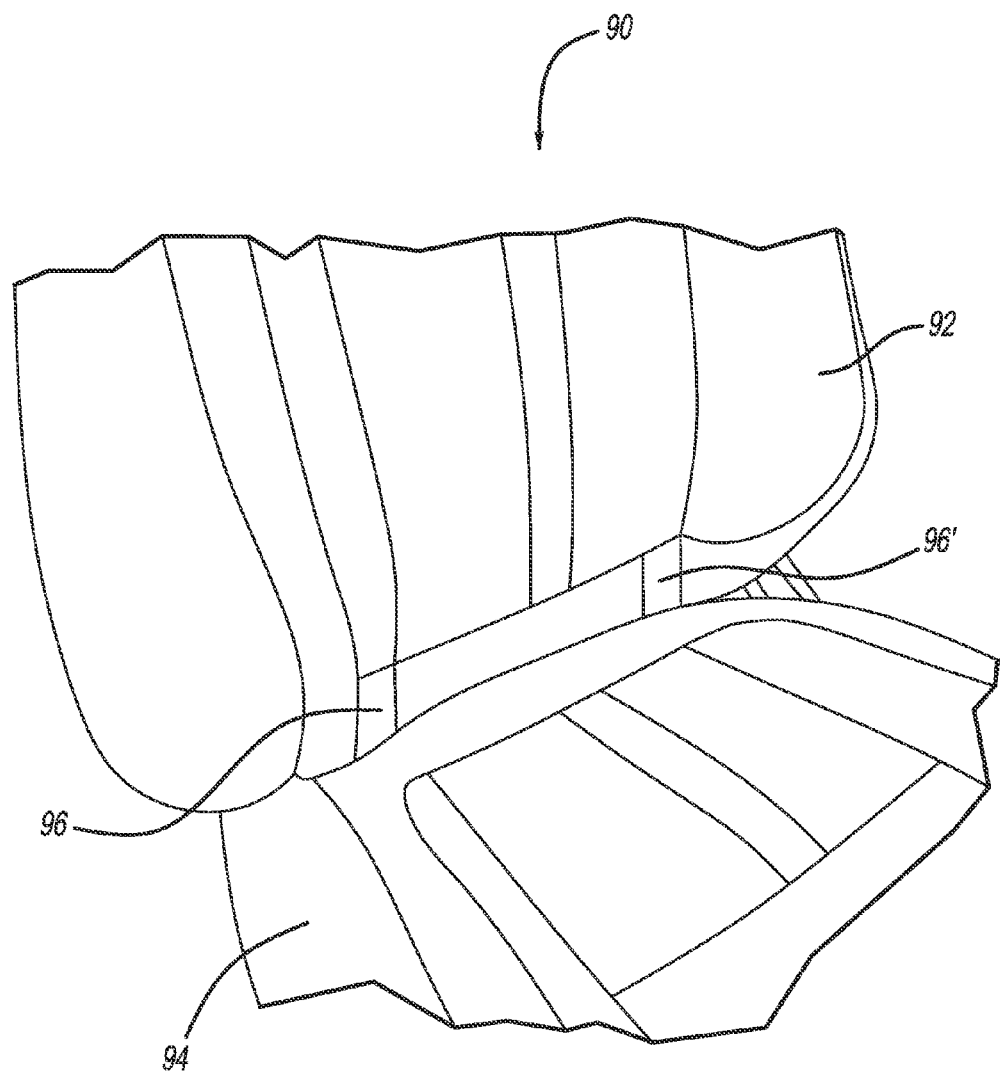
FIG. 13 is a perspective view of a seat base and seat back that incorporates an anchor system of the disclosed inventive concept in which the anchors are covered by a portion of the seat back.
Figure 14:
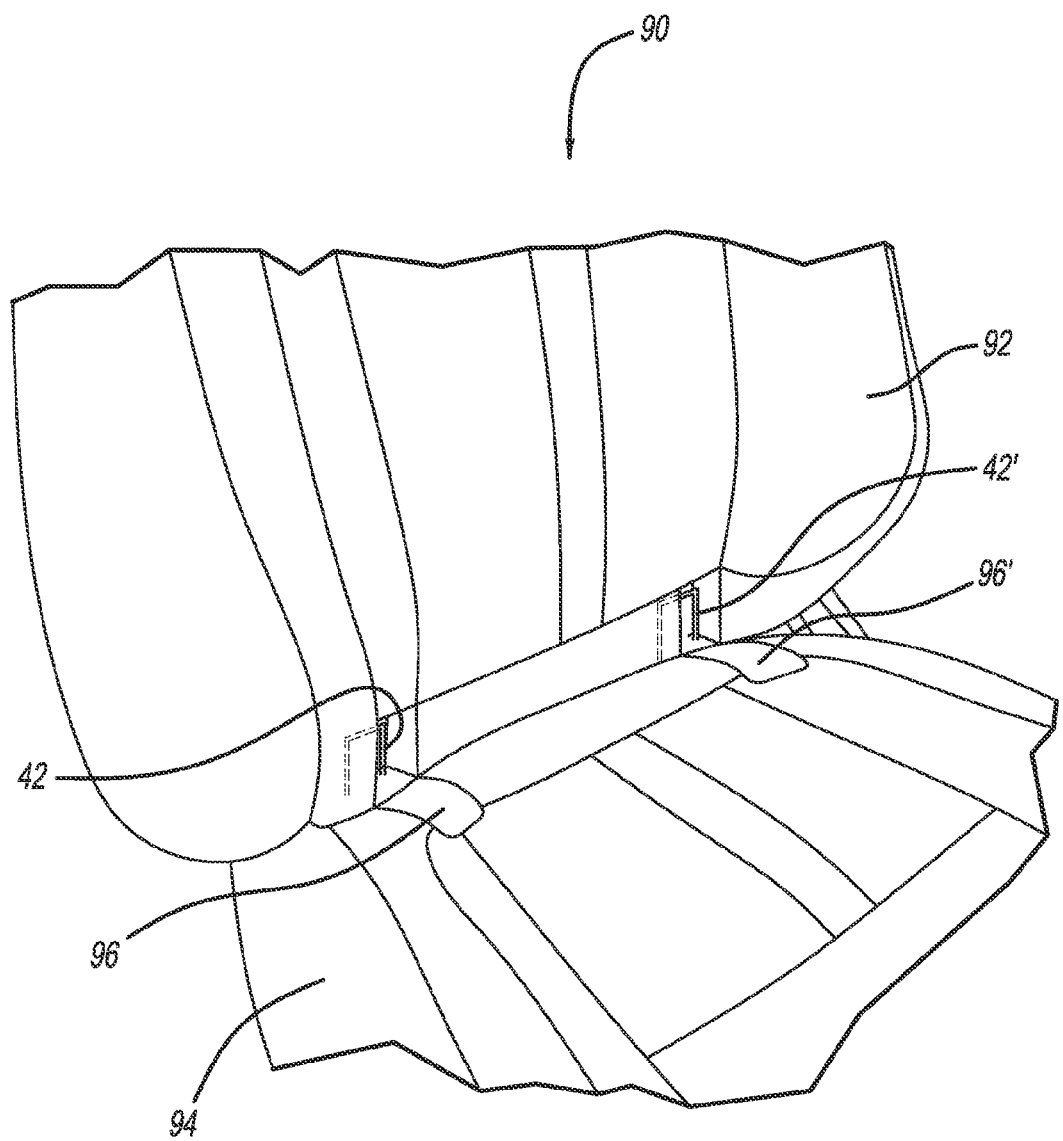
FIG. 14 is a view similar to that of FIG. 13, but illustrating the anchor covers positioned to reveal the anchors in stowed, concealed or less accessible positions.
Figure 15:
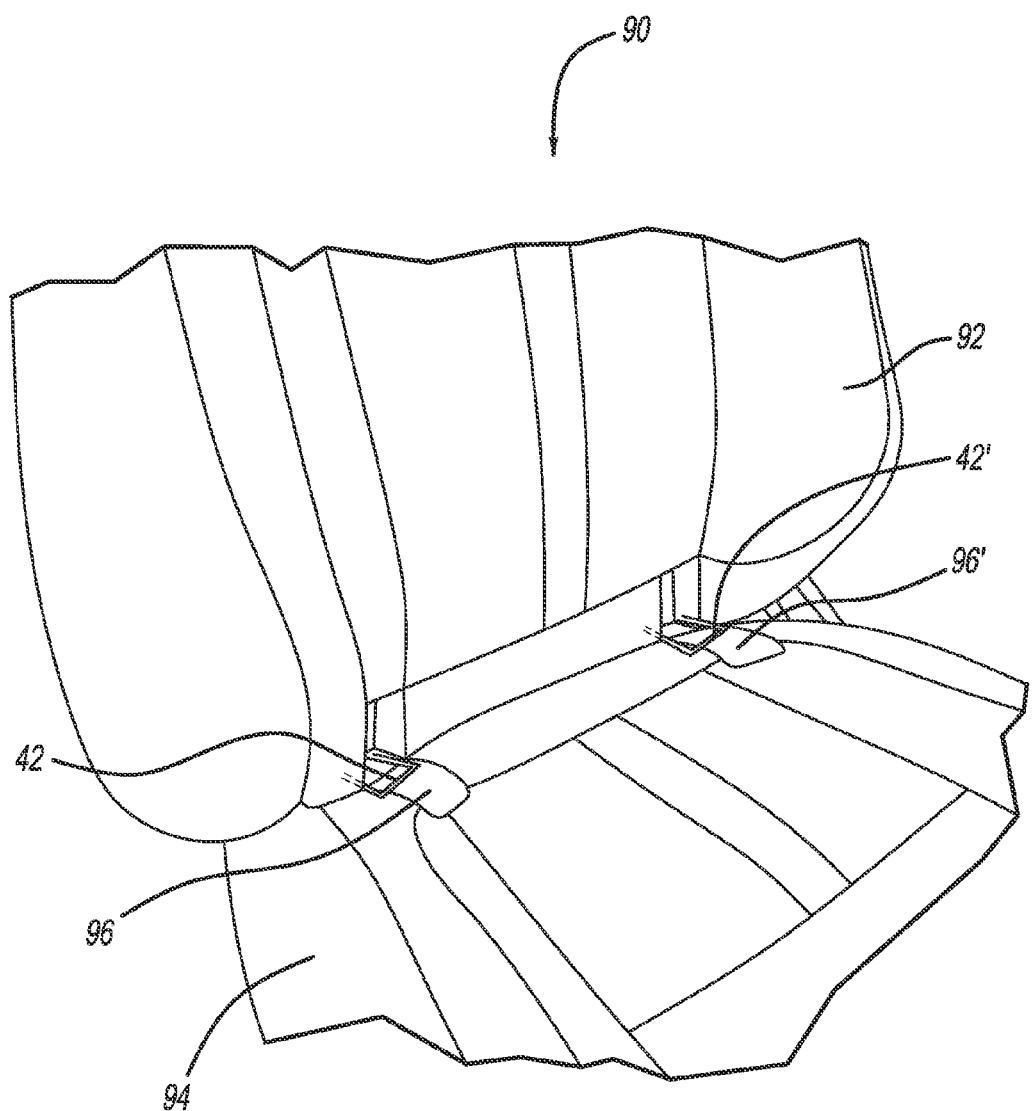
FIG. 15 is a view similar to that of FIG. 14, but showing the anchors in their enhanced accessibility positions.
Figure 26:
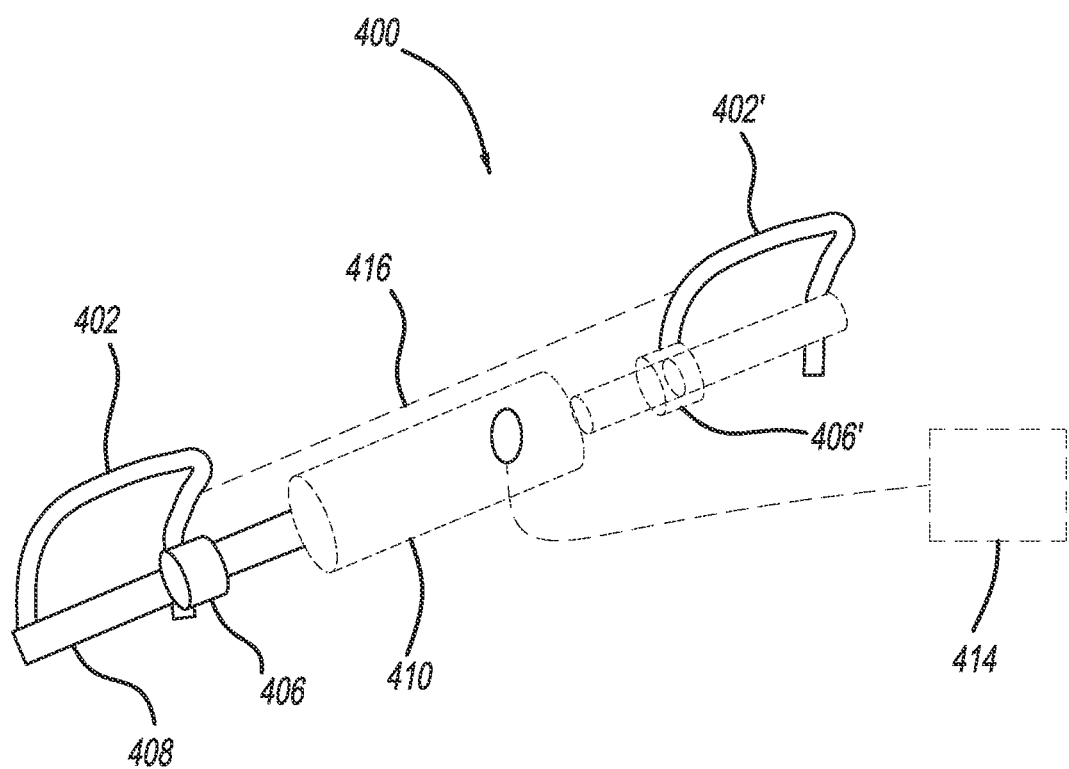
FIG. 26 illustrates a positional control and interlock and anchor assembly arrangement 400 where an actuator 410 (such as a motor) is provided to facilitate rotation of one or more child restraint anchor assemblies between operational positions.

The disclosed inventive concept provides a general solution to the problem encountered by users of a variety of today's vehicle anchor installations when trying to attach a CRS to child restraint anchors. The general solution consisting of rotating one or more anchors from a first to a second position is presented herein, depicted in FIGS. 4 through 6 illustrating and example of a rotatable lower anchor system arrangement incorporating a simple actuator and/or release handle associated with paired, interconnected rotatable anchor arrangements. A second interconnected anchor arrangement is shown in FIG. 7. FIGS. 8 through 12 illustrate a positional control and interlock assembly (PCIA) and child restraint anchor arrangement incorporating a simple operator interface handle. FIGS. 13 through 15 illustrate a simple proposed approach to concealing the pivotal child restraint anchors in the vehicle seat in one operating condition. FIGS. 16 and 17, 18 and 19, and 20 and 21 illustrate embodiments of a first, second and third approach, respectively, to employing a PCIA and child restraint anchor arrangement of the disclosed inventive concept, where the PCIA again interfaces a simple handle. FIGS. 22A and 22B provide a couple basic examples of alternate use conditions for a child restraint anchor in a CRS non-use position. FIGS. 23A, 23B, 24A, 24B, 25A and 25B illustrate different positional control and interlock to anchor assembly interfacing surface geometries permitting an anchor assembly to be constrained in multiple positions. FIG. 26 illustrates a PCIA and anchor assembly arrangement incorporating an actuator like a motor operatively associated with positioning one or more anchors.

FIGS. 4 through 6 illustrate a rotatable lower anchor system arrangement incorporated into, or interfacing, the structure of a vehicle seat generally illustrated as 30 in FIGS. 4 through 6. The aforementioned rotatable lower anchor system in these figures is located at the interface between an included seat base 34 and seat back 32. With respect to the seat back 32 or the seat base 34, a small cavity or depression (not shown) could be styled into the seat foam and seat trim cover to further improve clip-ability of a CRS attachment hook to an anchor in a given position, if desired.

A variety of paired, interconnected rotatable anchor arrangement assemblies may be provided, the first of which, interconnected anchor assembly 36, is shown in FIG. 5. FIG. 5 is shown with the foam and trim of seat base 34 removed to reveal a rotatable shaft or cross member 40 to which anchors (shown as anchor loops) 42 and 42' and a simple handle or positional control actuator 48 are attached, or from which anchors 42 and 42' and handle or positional control actuator 48 extend. The shaft or cross member 40 is shown rotatably mounted to the seat structure, minimally connected with seat 30 by way of interfacing an aperture or cavity disposed on each of a first and a second side member 44 and 46, respectively, of seat 30 or brackets attached thereto.

A second variation of an interconnected rotatable anchor assembly 38 is illustrated in FIG. 7. Regardless of the variation, the paired anchors of such an assembly, or one or more individual anchors if so configured, are rotatable between a position of enhanced CRS accessibility and an alternative position. Further, for any individual or interconnected anchors, the alternative position may represent a less accessible, a stowed, an alternate-use or a disengaged/CRS non-use position. In the event that an acceptable anchorage placement zone is provided and required for a given vehicle type in a given market, the alternative position may be the only zone-compliant anchor position, in which case this position may be lockable. The enhanced access position may be lockable. Provision of a lockable enhanced access position may be dependent on compliance with acceptable anchor placement zone requirements for "travel-ready" use, if applicable. Alternatively, the enhanced anchor access position may be configured to be accessible only while a positional control interlock (which may be connected to a handle 48) is disengaged or one or more anchor (loops) are manually held in a position that provides enhanced anchor accessibility, whereupon the anchors return to lock in a reduced accessibility, or zone compliant position (as applicable) after attaching a CRS to anchors 42 and 42' and returning handle 48 to the position shown in FIG. 5.

The hidden anchor assembly 36 of FIG. 4 is oriented such that anchors 42 and 42' are shown rotated generally "upward" in a concealed position. FIG. 5 depicts seat 30 with the foam and trim of seat base 34 removed to reveal the same anchor assembly orientation as described in reference to FIG. 4. In FIG. 6, the anchor assembly 36 (shown more completely in FIG. 5) is shown having been rotated "downward," thereby revealing and making accessible the pair anchors 42 and 42'.

A second variation of an anchor assembly 38, illustrated in FIG. 7, includes a pair of interconnected anchors (again shown in loop form) 50 and 50' attached by connector 52 that is offset from the rotational axis of anchors 50 and 50'. Loops 50 and 50' are rotatably mounted to pairs of interfacing anchor receiving elements 54 and 54', and 56 and 56', respectively. Anchor receiving elements 54, 54', 56, 56' are shown extending from support member 39, where support member 39 may be represented by a structural member of a vehicle or vehicle seat. Assembly 38, or support member 39 to which assembly 38 may be attached, may interface side members 44 and 46 of seat 30 of FIG. 5, or brackets attached thereto. Support member 39 may be a cross member of a vehicle seat.

It is to be understood that while two variations of interconnected rotatable anchor arrangement assemblies are disclosed and described herein, other configurations may be adopted without deviating from the invention as illustrated and as described. For example, a plurality of anchors may be interconnected for multiple adjacent vehicle seating positions linking multiple sets of pairs of plate-like or loop formed anchors. The positions of several anchors may be jointly controlled, where the anchors are located or mounted on, to or behind a seatback, or on or to a structure behind, above or below a seatback, such as a roof, a floor, or a vehicle package tray, etc. A single anchor may be rotatable in a similar fashion, where that anchor is located on a vehicle seatback, behind and/or above a vehicle seat and/or mounted to a portion of a vehicle structure for a free standing seat or seat having a base and/or back affixed directly to a vehicle structure. One or more anchors may be configured to rotate between a first position, such as a position of accessibility for attaching an upper child seat tether to a vehicle package tray vicinity anchor, to a second position of concealment within the interior of the vehicle compartment, where the second position provides an anchorage for attaching cargo to in the trunk of a vehicle. In addition, an actuator affecting anchor position and/or a positional control lock may be provided for manually reorienting and maintaining one or more positions of at least one anchor. Positional control and locking of an anchor or anchor assembly may further be mechanized/motorized/automated if so desired. FIG. 5 specifically depicts the child restraint loop shaped anchors extending from a common shaft or cross member of a freestanding seat. The axis of anchor rotation is coincident with that of the simple actuator handle shown, though rotational axes could be offset from one another as depicted in later figures.

The shaft from which the anchors are shown extending in FIG. 5 may be independent from the rear seat cross member that is affixed to right and left seat side members or seat recliner mechanisms, or it may alternatively serve as a pivotal rear cross member and carrier for the child restraint anchors. Thus a shaft or cross member carrying an individual anchor or multiple interconnected child anchors may interface side members of a free standing seat, or may be affixed to a vehicle structure in association with seats of different types, or in association with one or more anchors in an alternative location such as below, behind and/or above a seatback. In addition, the child restraint anchors could be attached to independent pivot joints extending from a seat frame or vehicle structure and further engage one another for the sole purpose of rotation where the connecting member itself, facilitating connective rotation, is not structural. Lastly, multiple pairs of anchors may be interconnected in association with, or extend from, a common rotatable shaft-like member, the position of all anchors simultaneously controlled as previously described in association with an individual or single pair of anchors.

As noted above, FIGS. 8 through 12 illustrate a child restraint anchor assembly and positional control and interlock assembly (PCIA) arrangement, generally illustrated as 60. Referring to these figures, arrangement 60 includes an anchor assembly 62, a positional control and interlock assembly (PCIA) 71 and an interfacing handle 64, illustrated from an end view.

Figure 8:
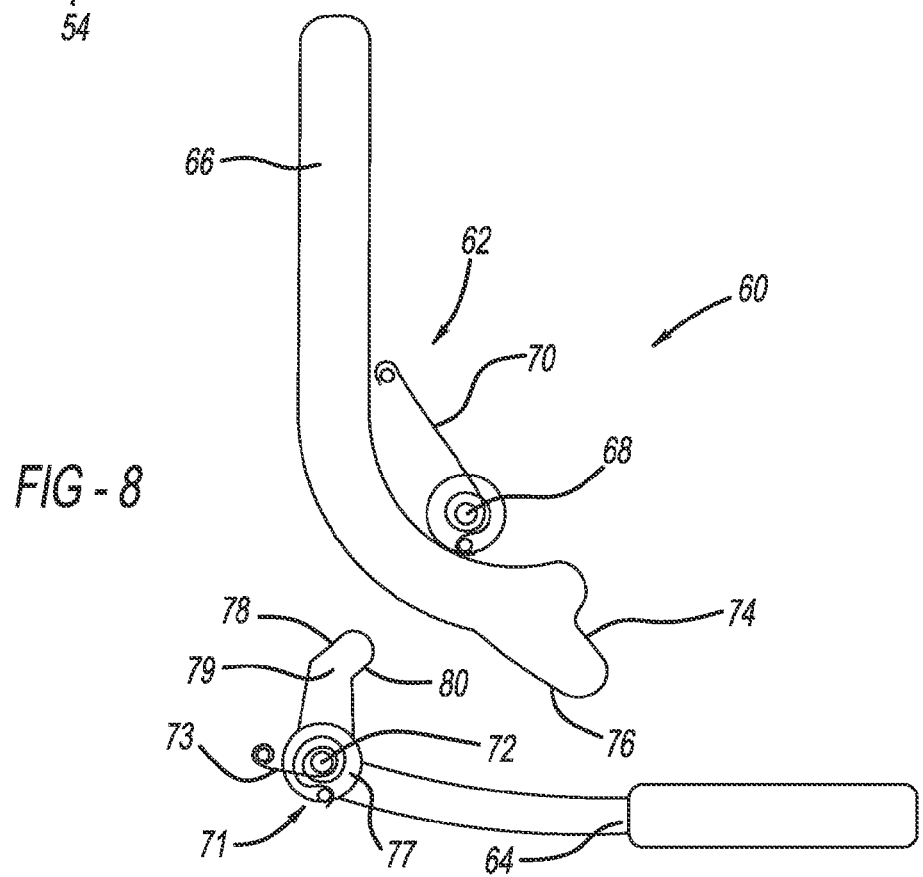
FIG. 8 is a side view of a PCIA or actuator/release mechanism for use with the system and method of the disclosed inventive concept illustrated in a first position, disengaged from an anchor assembly.
Figure 9:
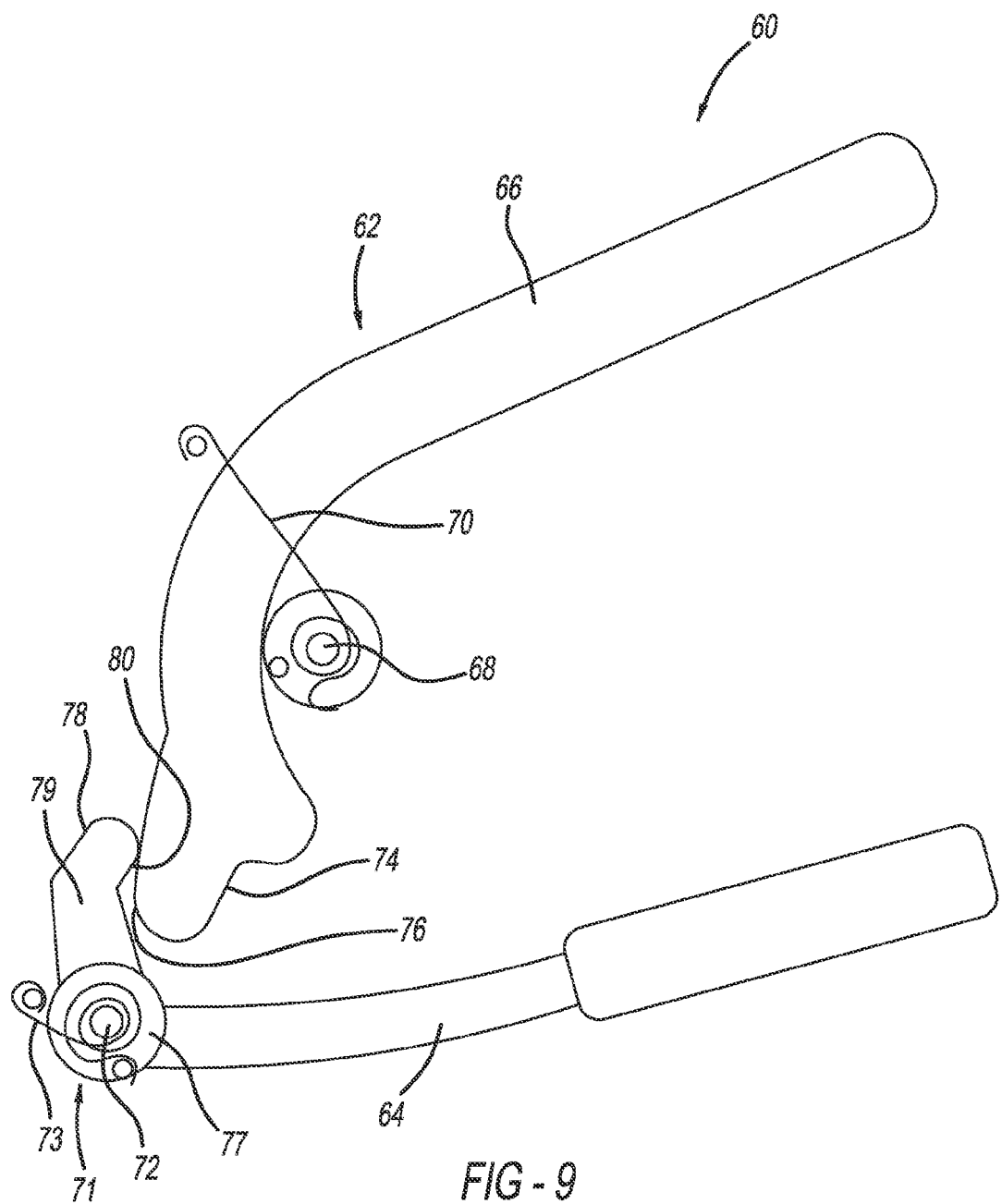
FIG. 9 is a view similar to that of FIG. 8 where the PCIA or actuator/release mechanism is illustrated in an intermediate position between the first position illustrated in FIG. 8 and the second position illustrated in FIG. 10.

Anchor assembly 62 includes at least one child restraint anchor, for example a formed loop or plate-like anchor incorporating an aperture for attaching to. A first child restraint anchor 66 is illustrated. Anchor assembly 62 includes a pivot 68 and a spring 70 affecting anchor position, relative to pivot 68. Spring 70 urges the anchor assembly 62 to a first unlocked position, as illustrated in FIG. 8.

PCIA 71 is mountable to a load carrying structural member of a vehicle seat, floor, roof, etc. as applicable. An anchor positioning positional control and interlock member (PCIM) 79 constrains the rotational orientation of an anchor assembly 62 in at least one direction in at least one operational anchor position. Positional control and interlock member 79 interfaces or includes an adjustment element or portion 77 that is moveable relative to a positional control axis 72, about which a spring 73 is situated. A handle 64 is shown interfacing adjustment element 77. Spring 73 is shown rotationally urging a positional control and interlock member 79, associated with handle 64, to a position of rotational disengagement between interlock member 79 and anchor assembly 62, shown in FIG. 8. For an example of a lower anchorage installation at the interface between a vehicle seat cushion and seatback, the configuration of FIG. 8 may represent a stowed, or a less accessible anchor position for CRS connection or removal as shown. For the same application, the above mentioned configuration, if rotated 90 degrees counterclockwise, could instead represent an enhanced anchor access position, where an alternative interlocked position is represents a stowed or less CRS interface anchor accessible position.

Pivot 68 and adjustment element or portion 77 may be represented by a shaft, or an aperture pivotal about a shaft. In reference to FIGS. 8-12, adjustment portion or element 77 of PCIA 71 may additionally (or alternatively) translate along the positional control axis 72 associated with PCIA 71 to facilitate linear movement in conjunction with, or instead of, rotational displacement of PCIM 79 in order to permit engagement with and disengagement from anchor assembly 62. Further, one or more springs 73 may bias adjustment element or portion 77 and PCIM 79 axially along positional control axis 72 towards the plane of potential engagement between positional control and interlock member 79 and anchor assembly 62. Spring 73 may bias PCIM 79 both rotationally and linearly. As such, handle 64 may be used to slide and/or rotate PCIA 71 into and out of engagement with anchor assembly 72, against the force of one or more springs 73.

The anchor assembly 62 includes a primary anchor positional control interfacing surface 74 and a secondary positional control interfacing surface 76. Positional control interlock member 79 includes a primary positional control member interface surface 78 and a secondary interface surface 80

When in an unlocked position as illustrated in FIG. 8, spring 70 urges anchor assembly 62 to a position in which no engagement with PCIM 79 occurs. Child restraint anchor 66 is shown in an intermediate position in FIG. 9, either by manual operation such as by rotating anchor assembly 62 against the tension of spring 70 or by a driver such as a motor. In this position, the secondary positional control interfacing surface 76 of anchor assembly 62 engages the secondary interfacing surface 80 of PCIM 79, urging pivotal movement of PCIM 79 and interfacing handle 64 against the tension of spring 73.

Figure 10:
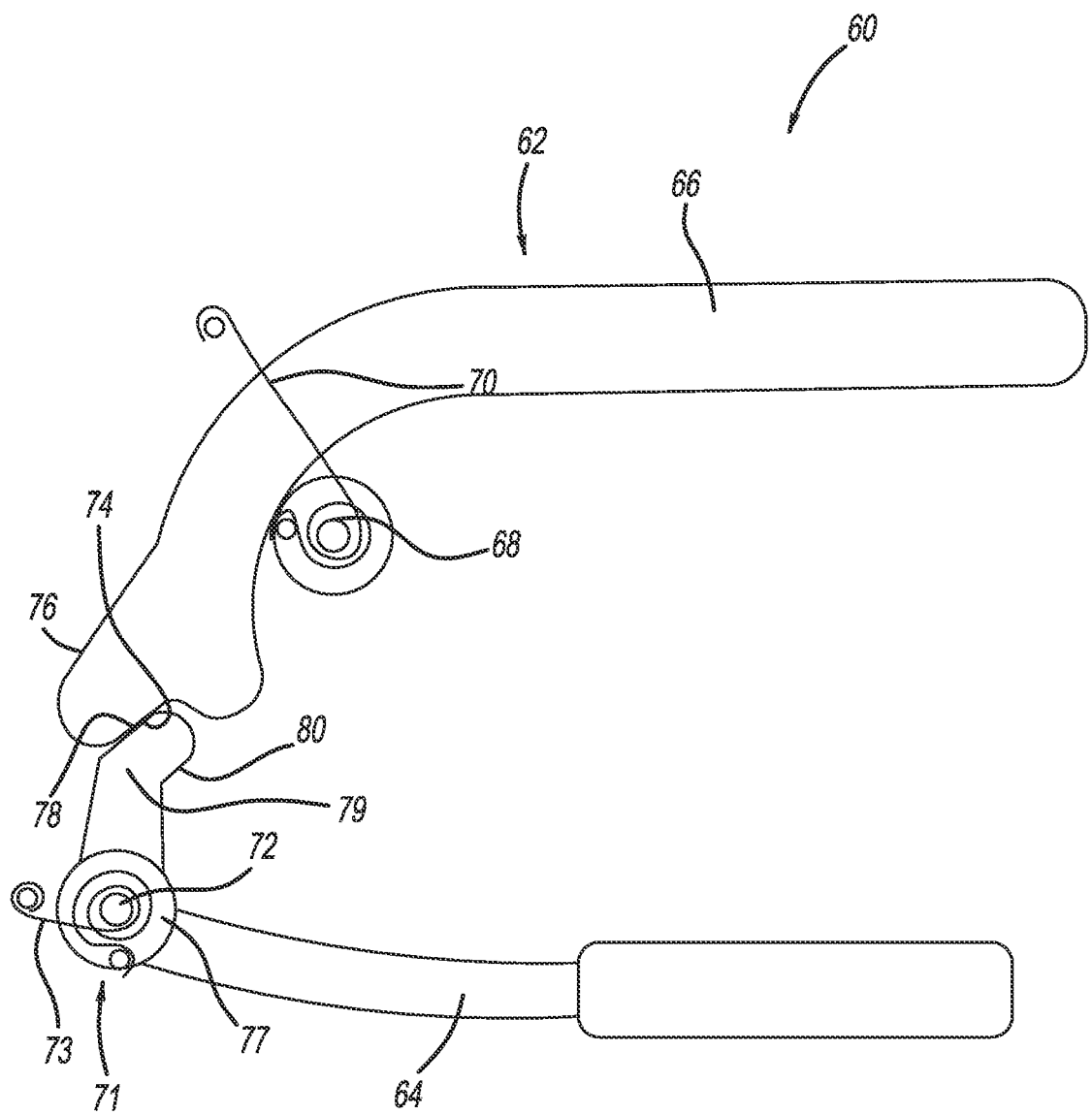
FIG. 10 is a view similar to that of FIG. 8, illustrating the PCIA or actuator/release mechanism in its second position, engaged with and controlling position of an anchor assembly.

Continued rotation of anchor assembly 62 results in sufficient displacement of anchor assembly 62 and PCIM 79 to ultimately enable the positive positional locking control of anchor assembly 62 resulting from the interface condition between the primary positional control member interface surface 78 of the PCIM 79 against the primary anchor positional control interfacing surface 74 of the anchor assembly 62. This arrangement, shown in FIG. 10, retains the child restraint anchor 66 in a locked position, or a position precluding counter-clockwise rotation of the anchor back towards the anchor position of FIG. 8. In the case of FIG. 10, this locked position may represent a position of enhanced anchor accessibility for a given anchor mounting location or vehicle application and stowed, or alternative use location in a different anchor mounting location or vehicle application. Again, the orientation of the anchor assembly and PCIA relative to the page may be altered from that depicted in FIGS. 8 through 10. For example, if FIGS. 8 through 10 were rotated clockwise 90 degrees, the anchor position of FIG. 8 could represent a more horizontal position that may be found on an automobile vehicle package tray for child seat top tether anchoring while the revised position of FIG. 10 could represent anchor rotation into a concealed CRS access position, revealing the anchor in a secondary, alternate use location within a vehicle trunk compartment as a luggage retention anchorage. Furthermore, anchor assembly 62, PCIM 79 and associated elements, components and contact surfaces described above may be revised to additionally, or alternatively, provide locking capability for anchor assembly 62 with respect to PCIM 79 in the aforementioned "first" anchor position shown in FIG. 8.

Figure 11:
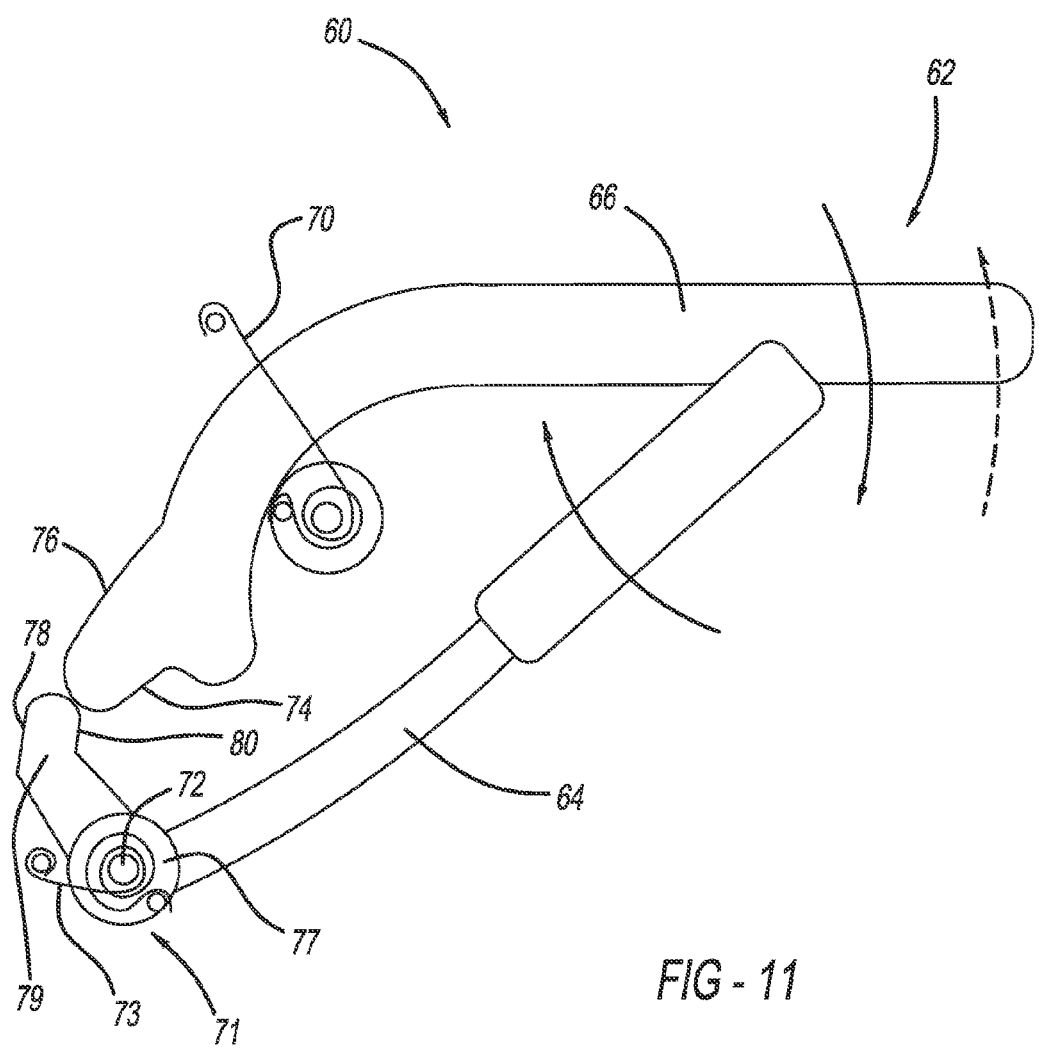
FIG. 11 is a view similar to that of FIG. 10, illustrating the PCIA or actuator/release mechanism partially rotated to facilitate disengagement from the anchor assembly to permit returning each to the first position illustrated in FIG. 8.

To release anchor assembly 62 of the basic child restraint anchor and positional control and interlock assembly arrangement 60 to enable anchor assembly 62 to return to the first position, the handle 64 may be lifted to rotate PCIM 79 such that the anchor assembly 62 is released from a locked position relative to PCIM 79 as shown in FIG. 11. Displacement of the anchor assembly 62 in a clockwise direction shown by the solid arrow allows PCIM 79 to pass thereby and to permit anchor assembly 62 return to a position of disengagement from PCIM 79. While not illustrated, for a configuration incorporating a spring 73 capable of biasing PCIM 79 axially towards a plane of engagement with anchor assembly 62, handle 64 may either additionally, or alternatively, be used to translate PCIM 79 along positional control axis 72 to disengage PCIM 79 from contact with anchor assembly 62. Accordingly, handle 74 and PCIM 79 need not be rotatable as illustrated in FIGS. 8 through 12 to provide the intended function of engaging and releasing PCIM from contact with anchor assembly 62.

Figure 12:
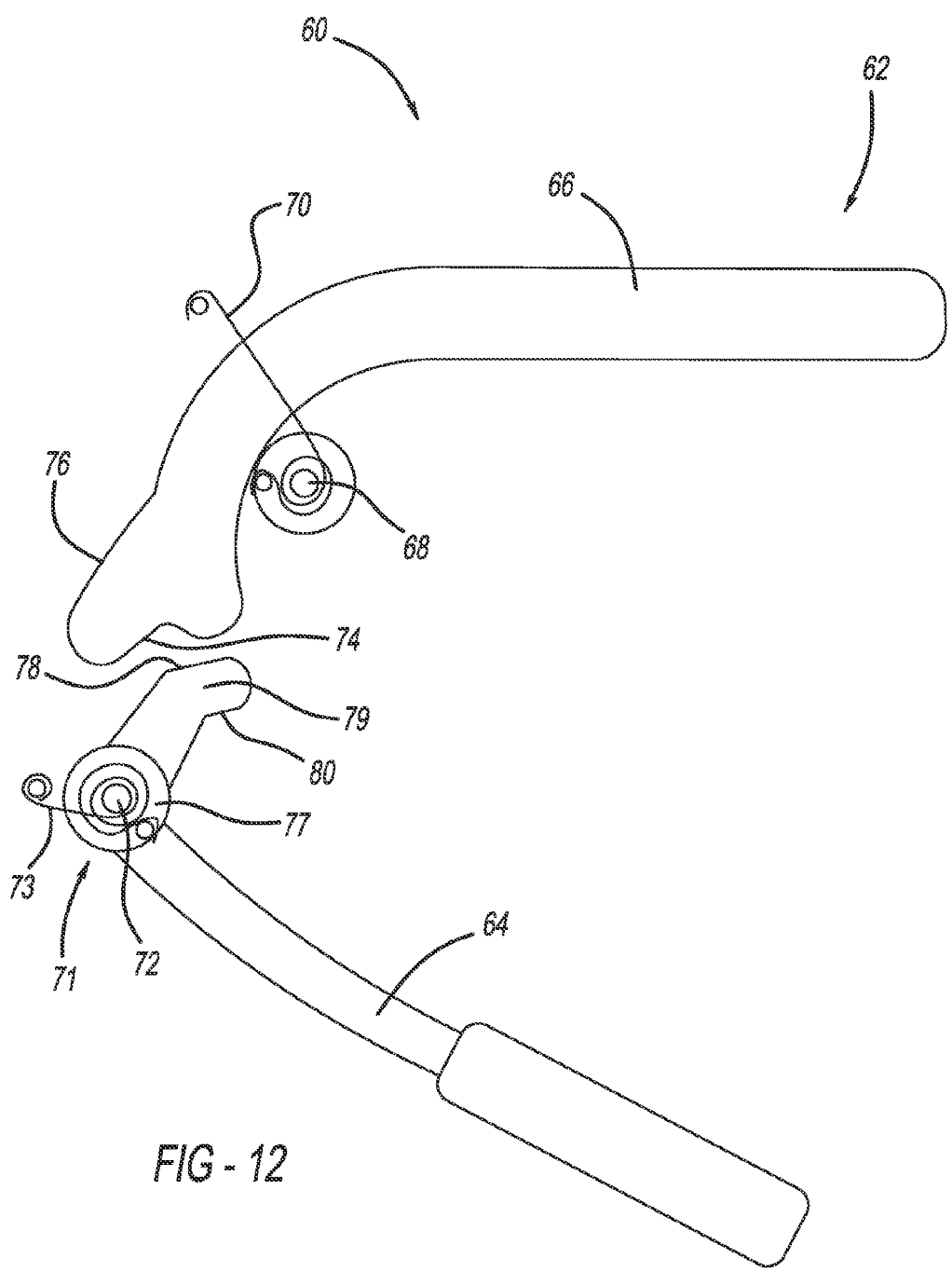
FIG. 12 is a view similar to that of FIG. 11 but illustrating an alternative method of disengaging a PCIA or actuator/release mechanism from an interfacing anchor assembly prior to returning to the first positions illustrated in FIG. 8.

An alternative approach to releasing anchor assembly 62 is illustrated in FIG. 12, in which PCIM 79 is released from the fixed position that constrains anchor rotation and handle 64 is rotated downward as shown, resulting in the release of the anchor assembly 62 from a rotationally constrained position of engagement with PCIM 79. Anchor assembly 62 is thereby permitted to return to the aforementioned first position shown in FIG. 8, after which the PCIM 79 may also return to a position of disengagement from anchor assembly 62, providing the first position for anchor assembly 62 is not additionally or alternatively lockable as shown in subsequent figures.

While the disclosed inventive concept overcomes a variety of challenges associated with the use of concealed or somewhat inaccessible vehicle child restraint anchors by providing simple and practical enhanced accessibility for CRS attachment to vehicle anchors, the disclosed inventive concept also provides a convenient and practical method of concealing the child restraint anchors when not in use.

Referring to FIG. 13, a perspective view of a portion of a vehicle seat, generally illustrated as 90, is shown. The vehicle seat 90 incorporates the CRS anchoring system discussed above and illustrated herein. The vehicle seat 90 includes a seat back 92 and a seat base 94.

Concealing flaps 96 and 96' are flexibly attached to the seat back 92. Alternatively, the concealing flaps 96 and 96' could be attached to the seat base 94. The concealing flaps 96 and 96' may be held in place by such detachable means as hook and fasteners (i.e., Velcro®) or alternative mechanical fasteners, such as snaps, clips (none shown).

When the child restraint anchors are not in use for child seat attachment, flaps 96 and 96' are in their concealing position as illustrated in FIG. 13. However, when it is desirable to expose the child restraint anchors, the concealing flaps 96 and 96' are moved to exposing positions as illustrated in FIG. 14. Thus moved, a pair of child restraint anchor 42 and 42' are partially visible and can be moved to their enhanced accessibility positions illustrated in FIG. 15.

Having described and illustrated a positional control interlock incorporating an example of a manual user actuator or release lever/handle control, a child restraint anchor and a concealing arrangement, various embodiments of a positional control interlock assembly (interfacing a simple handle) and a child restraint anchor arrangement are illustrated in paired FIGS. 16 and 17, 18 and 19, and 20 and 21, in which three embodiments of the disclosed inventive concept are illustrated, respectively, in association with a vehicle seat.

Figure 16:
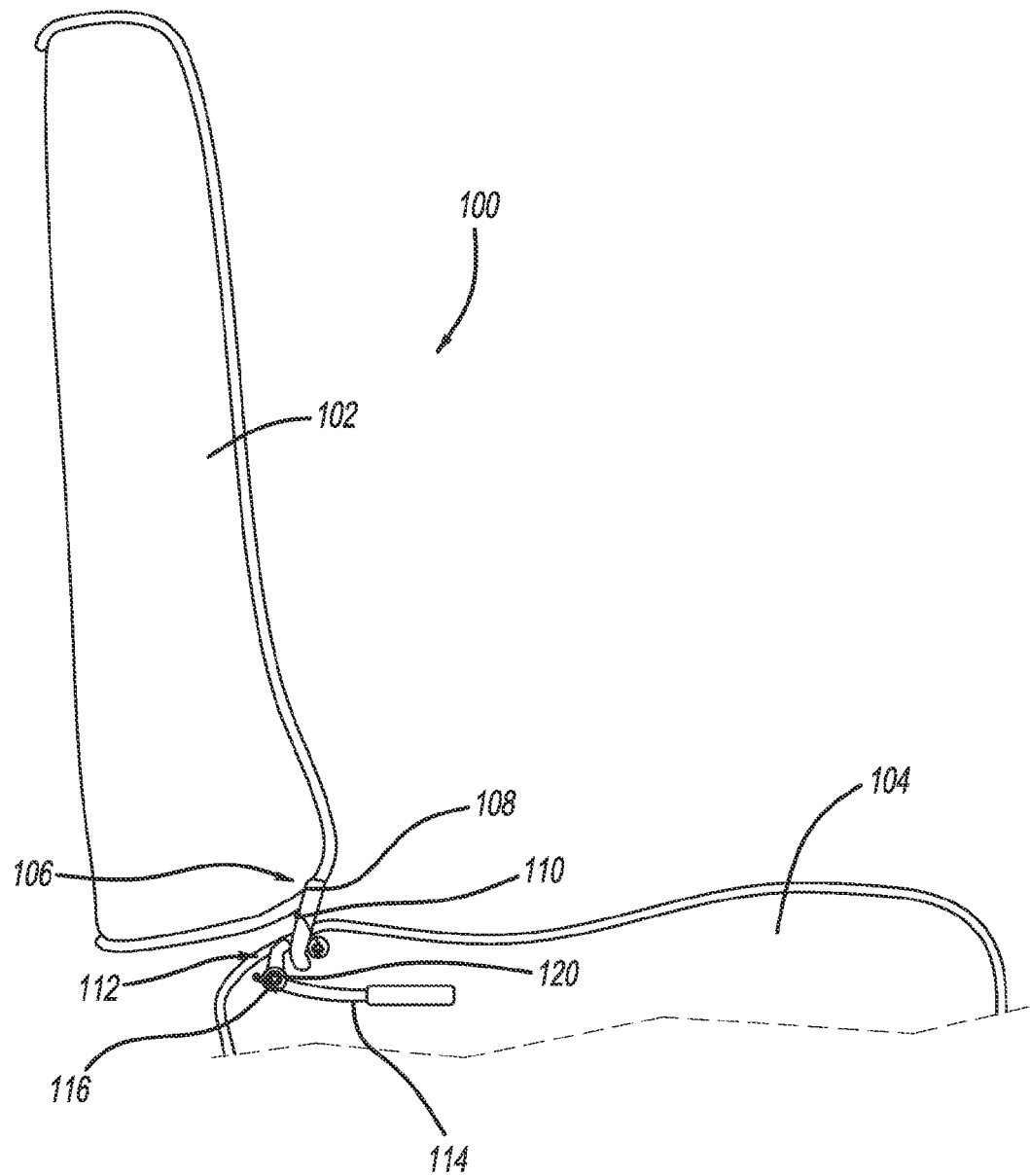
FIG. 16 is an end view shown in cross section of an anchor assembly and PCIA arrangement according to a first embodiment of the disclosed inventive concept in which an anchor is in a position of reduced accessibility.
Figure 17:
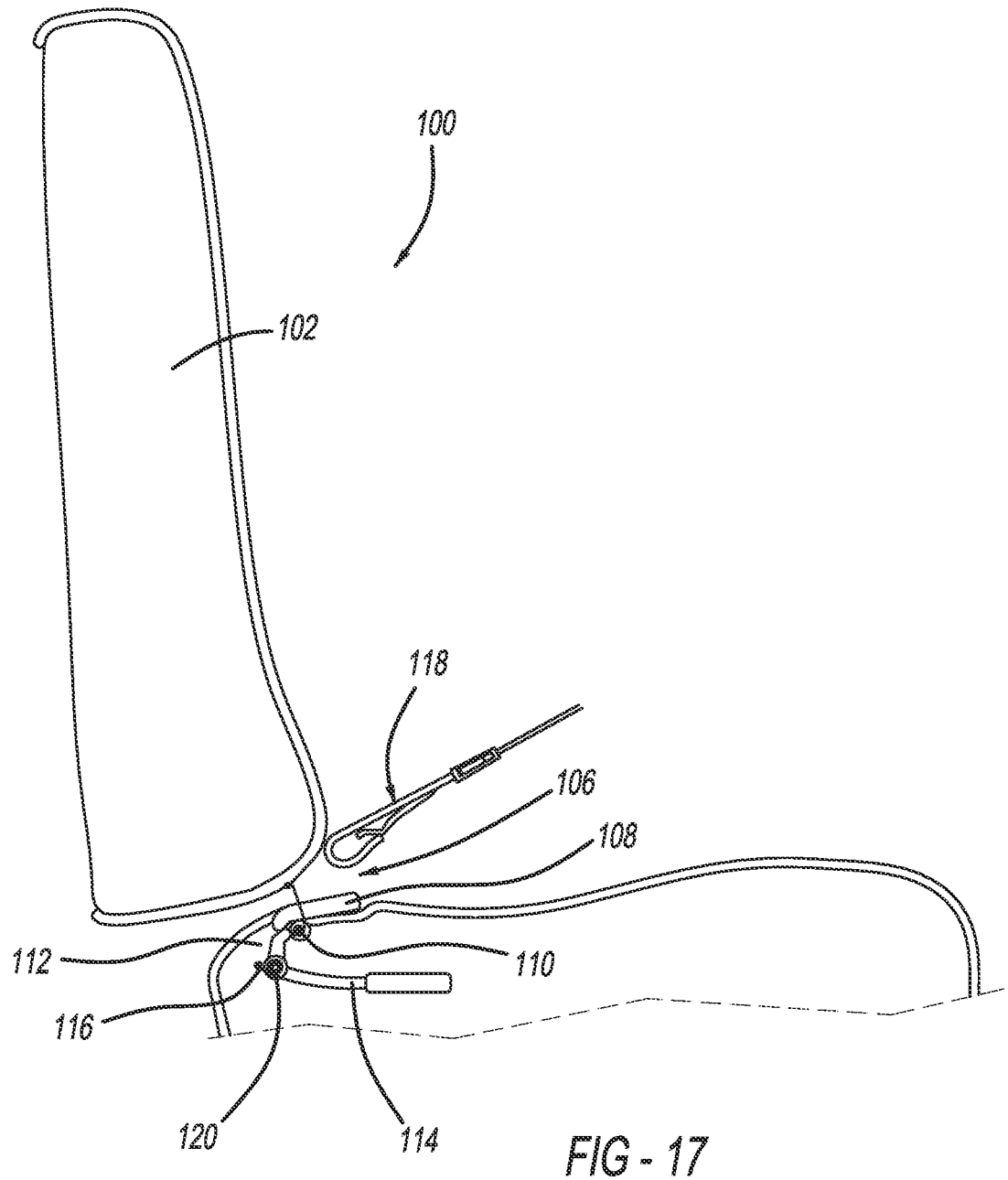
FIG. 17 is a view similar to that of FIG. 13, but showing the anchor moved to a position of enhanced accessibility.
Figure 18:
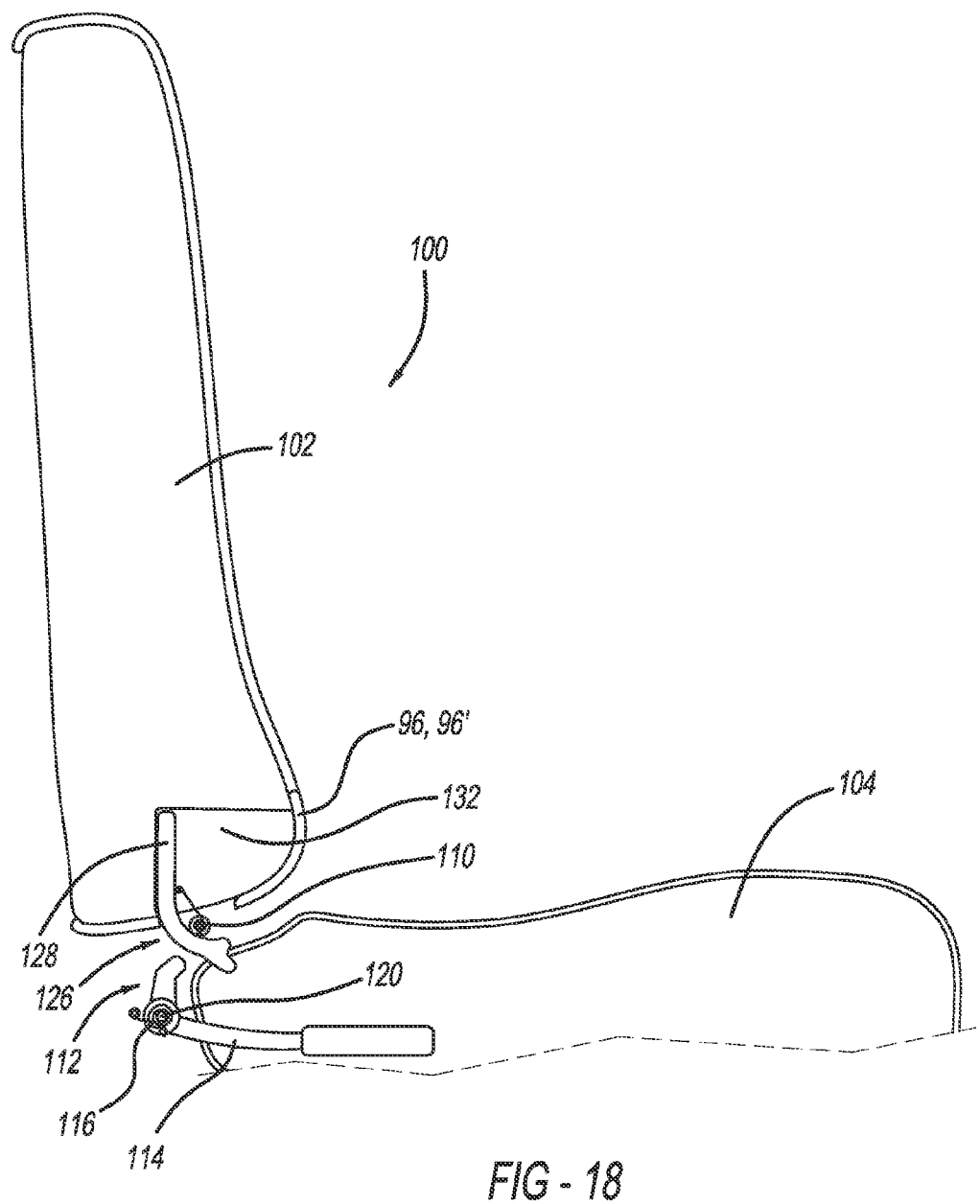
FIG. 18 is an end view shown in cross section of a PCIA and anchor assembly arrangement according to a second embodiment of the disclosed inventive concept in which an anchor is in a concealed or stowed position.
Figure 19:
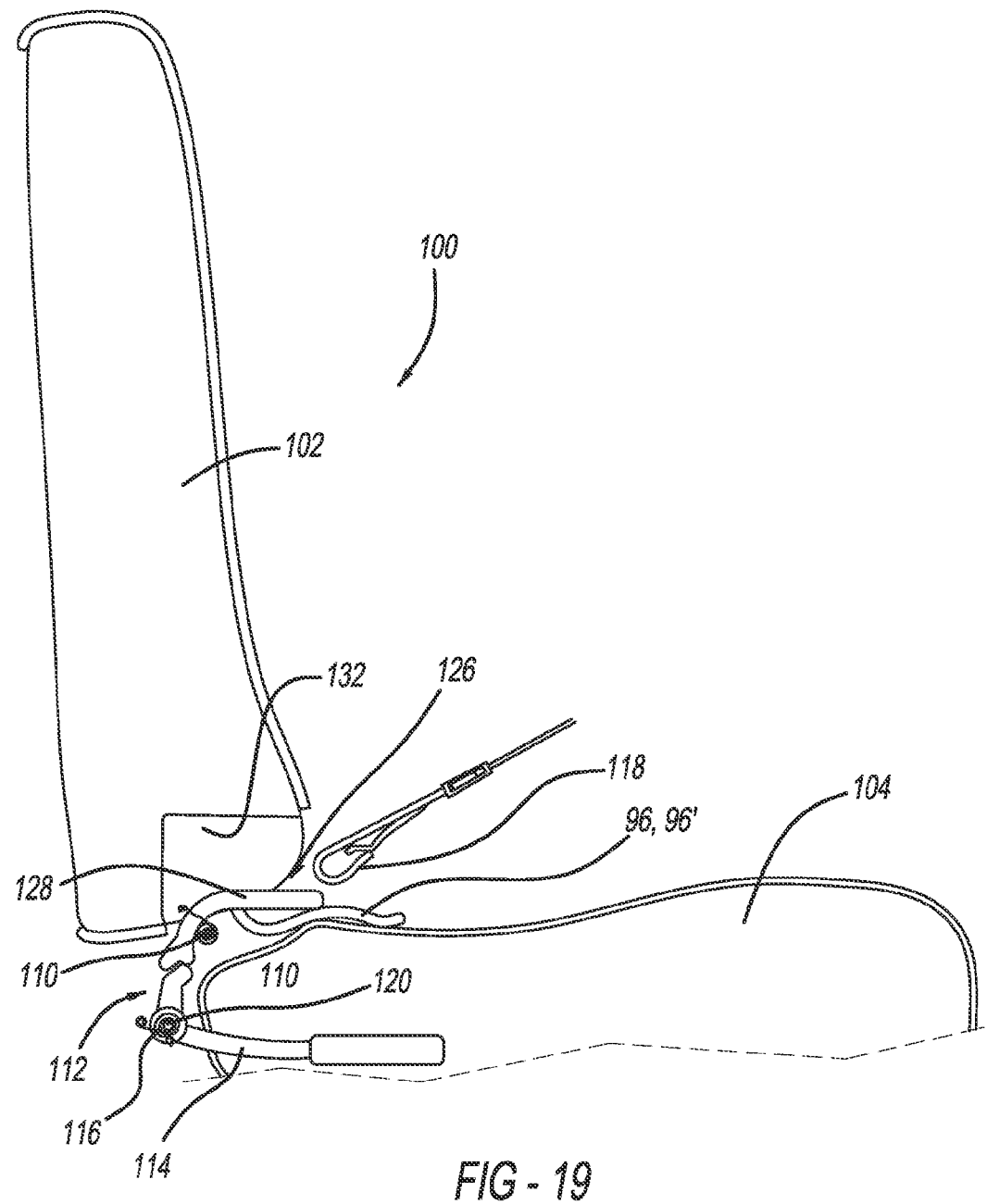
FIG. 19 is a view similar to that of FIG. 18 but showing the anchor moved to an accessible position.
Figure 20:
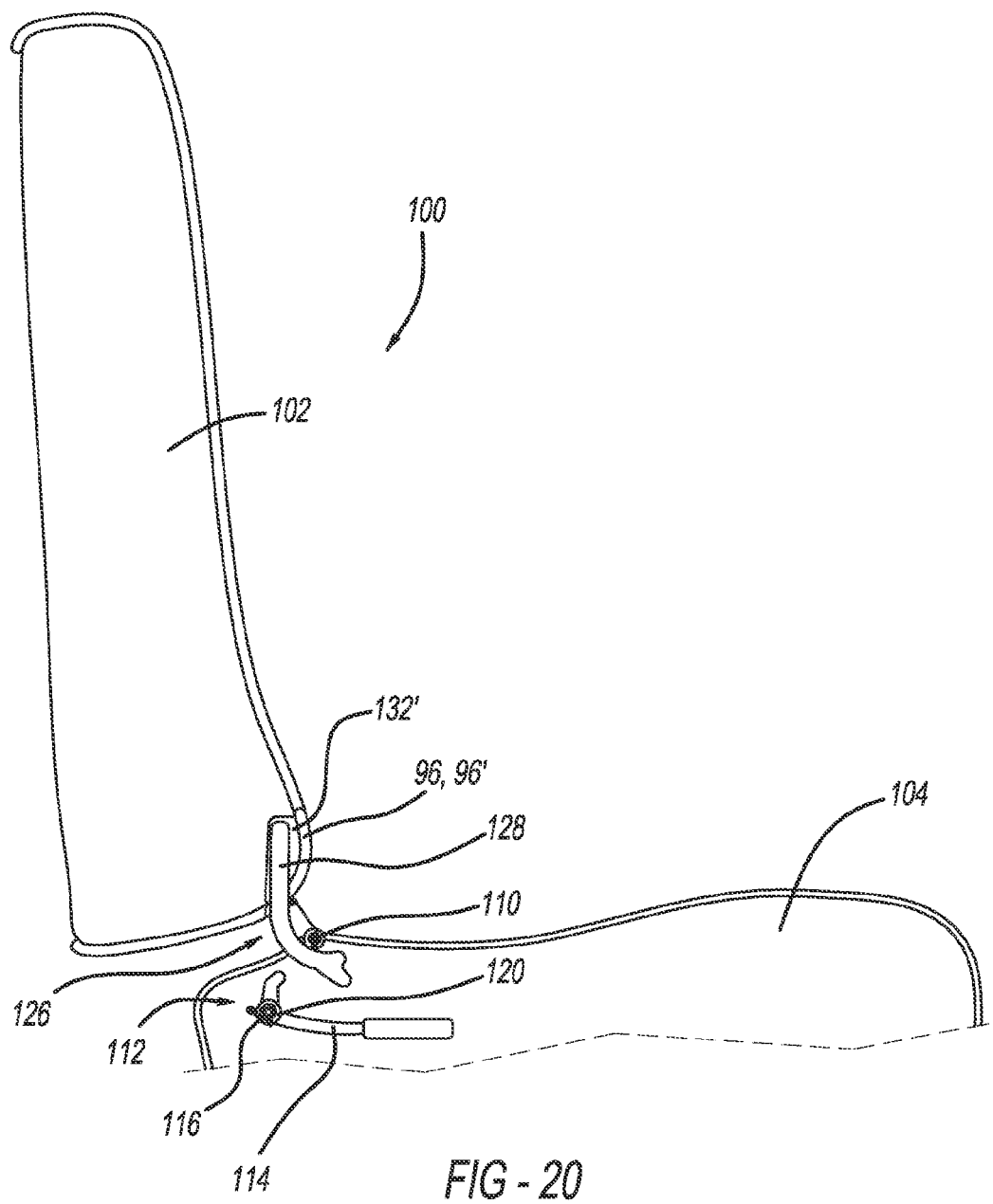
FIG. 20 is an end view shown in cross section of a PCIA and anchor assembly according to a third embodiment of the disclosed inventive concept in which an anchor is in a concealed or stowed position.

For FIGS. 16 through 21, a vehicle seat, generally illustrated as 100, includes a seat back 102 and a seat base 104. Anchor assemblies 106 and 126 include child restraint anchor 108 and 128, respectively, and a spring 110. Spring 110 urges an anchor 108 or 128 to a given position, such a position for enhanced CRS engagement, non-use, alternative usage or concealment, providing increased or reduced anchor accessibility, which may serve as a non-CRS usage, a stowed position, or a CRS use anchor placement zone compliant or non-compliant position (where applicable for a given region or market). FIGS. 16, 18 and 20, illustrate a spring urging an anchor to a less accessible position, relative to the seat shown.

A positional control and interlock assembly (PCIA) 112 is shown incorporating at least one spring 116, PCIA 112 further shown interfacing a handle 114. PCIA 112 and handle 114 are each shown in a first position relative to a vehicle seat 100 in FIGS. 16, 18 and 20. Spring 116 may urge PCIA 112 to rotate in a given planar direction (for example parallel to the plane of the page containing FIGS. 16 through 21), transverse to an axis of rotation 120 of PCIA 112. Spring 116 may additionally, or alternatively, urge the PCIA 112 in a transverse direction along axis 120, where the PCIA is urged towards the rotational plane of engagement between an anchor assembly and PCIA 112. Handle 114 interfacing PCIA 112 may be manipulated to rotate PCIA 112 into and out of contact with anchor assemblies 106 and 126, within the plane of engagement between the PCIA and anchor assembly and/or in and out of the plane of engagement with an anchor assembly, as determined by the design configuration. Further, PCIA 112 may be constrained to rotate about a pin-like axis 120 in a single fixed plane of rotation or PCIA 112 may be slide-able along axis 120 if so desired, when displaced against a force applied by spring 116 by a user. PCIA 112 may rotate about a threaded axis 120 allowing PCIA 112 to be moveable into and out of contact with an anchor assembly (rotationally and/or in and out of a plane of engagement).

For FIGS. 18 through 21, a deep pocket 132 or a shallow pocket 132' is formed in seat back 102, within which an anchor assembly 126 (including anchor 128) is substantially housed and concealed in one position, as illustrated in FIGS. 18 and 20. Pockets 132 and 132' allow an anchor 128 to be positioned at various concealed (or reduced accessibility) depths within a seat back 102, for example. Such a position may be provided to improve comfort or appearance. A similar pocket may be provided on a vehicle rearward facing portion of a seatback, a package tray, in a vehicle roof, etc. for anchor locations (such as CRS top tether anchor locations) other than shown relative to the interface between a vehicle seat cushion and back in FIGS. 16 through 21. A simple access strap (not shown) could extend from a side leg of an anchor 108 of FIGS. 16 and 17, or anchor 128 of FIGS. 18 through 21 to enhance access to an anchor to manually rotate the anchor to a position of enhanced accessibility. Alternatively, rotation of an anchor assembly 106 of FIGS. 16 and 17 or anchor assembly 126 could be linked to an independent actuator or controlled by incorporating additional interfacing elements or surfaces on either or both of the anchor assembly and positional control interlock assembly as shown in later figures.

A pocket 132 or 132' may be covered when an anchor 128 is recessed within the pocket by including concealing flaps such the concealing flaps 96 and 96' illustrated in FIGS. 13 through 15 and discussed in conjunction therewith.

The positional control and interlock assembly (PCIA) 112 shown interfacing handle 114 is also shown disengaged from anchor assembly 126 in FIGS. 18 and 20.

Figure 21:
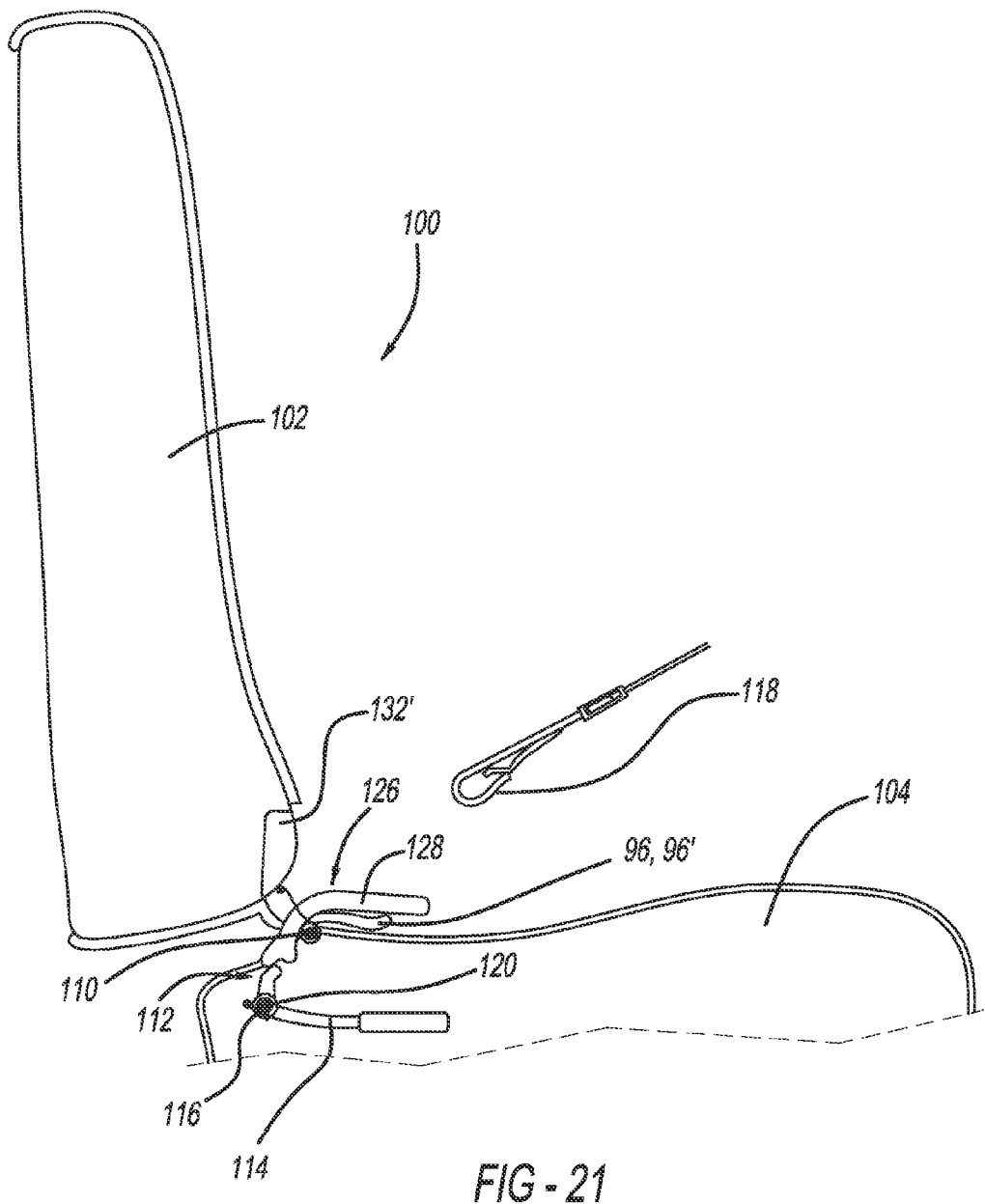
FIG. 21 is a view similar to that of FIG. 20 but showing the anchor moved to its accessible position.
Figure 22A:
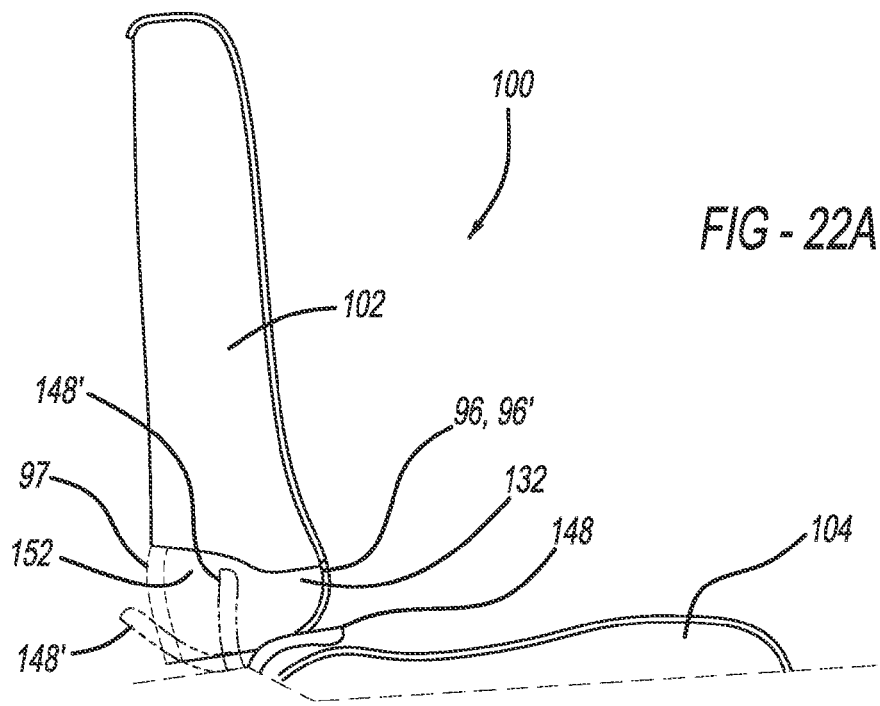
FIG. 22A is an end view of a vehicle seat having a child restraint anchor in its non-use position in which the anchor is concealed within the seatback.
Figure 22B:
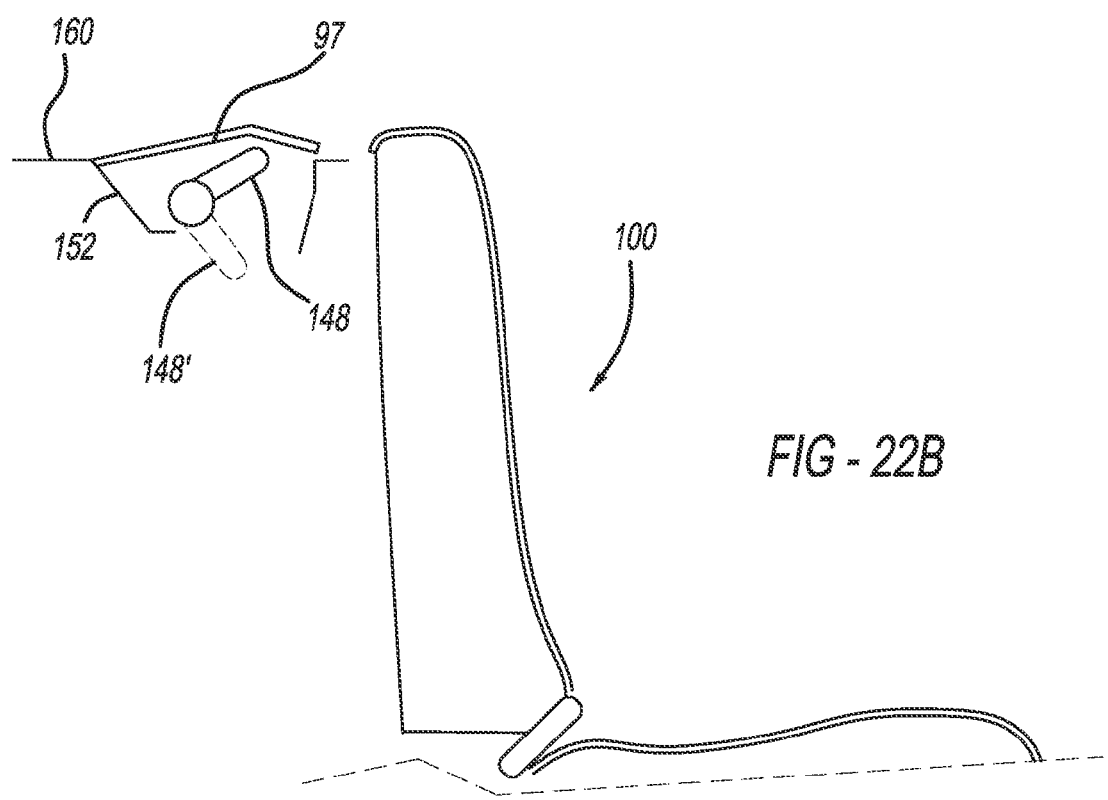
FIG. 22B is an end view of a vehicle seat having a child restraint anchor in its non-use position in which the anchor is concealed within a package tray behind the seatback.

A vehicle mounted CRS anchor 108 or 128 is moveable (manually or automatically) to a more readily engageable position shown in FIGS. 17, 19 and 21 to enhance accessibility for attaching or disengaging an anchor clasp 118 extending from a child seat. In this position, anchor assembly 106 or 126 has engaged PCIA 112 such that anchor 108 or 128 is constrained as illustrated. The anchor is precluded from rotating back to a position of reduced accessibility without user interaction to intentionally disengage anchor assembly 106 or 126 from constraining interaction with PCIA 112. A handle 114 interfacing PCIA 112 may be manipulated to (as previously described) to facilitate releasing and allowing anchor 108 or 128 to return to the position shown in FIGS. 16, 18 and 20. While not shown in FIGS. 16 through 21, it can be understood that the PCIA and anchor assembly arrangement can be adapted to permit locking of an anchor assembly in a first position, such as shown in FIGS. 16, 18 and 20, where such a position may be zone-compliant and the anchor positions shown in FIGS. 17, 19 and 21 are provided to temporarily enhance accessibility for attachment and disengagement of a CRS. Under these circumstances, the anchor assemblies of FIGS. 17, 19 and 21 may be held in position by overcoming a spring force 110 alone, whether or not constrainable in such a position through engagement with PCIA 112 that may be attached to a manual user operable control handle 112 or an independent actuator/release mechanism.

FIGS. 22A and 22B illustrate examples of alternative-use CRS anchor positions achievable by facilitating rotation of one or more upper or lower anchors between two or more positions, wherein at least one of a plurality of available CRS anchor positions enables provision of secondary anchor functionality, such as luggage retention, etc. More particularly, FIGS. 22A and 22B show vehicle seats 100, where a CRS anchor is rotatable between a position of enhanced CRS anchor 148 accessibility and at least a second position illustrated by an altered position of an anchor 148'. The position of anchor 148' may be one of concealment relative to CRS anchor engagement, such as within or extending from a pocket 132 or 152 of seatback 102 (as shown in FIG. 22A) or package tray 160 (as shown in FIG. 22B), behind seatback 102, respectively, or within the trunk space of a vehicle, beneath a package tray 160 located behind a vehicle seat 100. Either or both positions may be spring biased to a given position and/or fixable and constrained by engagement with a positional control interlock member or assembly in one or more positions (shown in other figures). Concealment flaps or covers 96, 96', or 97 may also be provided.

FIGS. 23A, 23B, 24A, 24B, 25A and 25B illustrate various embodiments of a portion of an anchor assembly and a portion of a positional control and interlock assembly (PCIA) arrangement incorporating simple examples of PCIA-to-anchor assembly interfacing surface conditions permitting an anchor assembly to be constrained in multiple discrete "endpoint" positions or to be constrained over a more continuous range of positions.

In each of FIGS. 23A, 23B, 24A, 24B, 25A and 25B, a portion of an anchor assembly 200 is shown incorporating an anchor 206, first and second anchor positional control interfacing surfaces 212 and 214 and an anchor pivotal axis 216. A portion of positional control and interlock assembly 300 incorporates a positional control interlock member (PCIM) 318, positional control interlock member interface surfaces 312 and 314 and positional control interlock member positional adjustment axis 316. While shown as offset from one another, positional adjustment axis 316 and pivotal axis 216 may be co-linear and geometries, positions, orientations of interfacing surfaces 212 and 214 of anchor assembly 200 and surfaces 312 and 314 of positional control interlock member 318 adjusted to provide constraining engagement between one or more locations on assembly 200 and one or more member(s) 318 of PCIA 300, accordingly.

As illustrated in FIGS. 23A and 24A, engagement between interfacing surfaces 212 and 312 of anchor assembly 200 and PCIA 300 prevent clockwise rotation of anchor assembly 200 in a first engaged operating condition, upon fixing the position of PCIM 318. Interfacing surfaces 214 and 314 are also shown engaged to prevent counter-clockwise rotation of anchor assembly 200 in a second PCIA-to-anchor assembly operating condition as illustrated in FIGS. 23B and 24B.

Springs and manual actuator levers or handles or other forms of actuation are not shown. The springs shown and described in reference to other included figures can urge a positional control interlock member or an anchor assembly to rotate or translate in a preferred direction, as previously indicated. A push/pull or rotational lever type actuator may engage a positional control and interlock assembly and spring force in one or more directions and may bias the positional control and interlock assembly to a position or plane of engagement with the anchor assembly. While not shown, such a spring may be oriented such that the direction of force into or out of the page in FIGS. 23A, 23B, 24A, 24B, 25A and 25B may be aligned with the pivotal axis of one or more anchors and/or the positional adjustment axis of one or more positional control and interlock members, as previously described. Overcoming this spring force by manipulating the PCIA connected to a simple actuator can facilitate disengagement of the PCIA from connection with the anchor assembly in order to rotate the anchor assembly to an alternate position of engagement with an interfacing positional control interlocking member surface.

A PCIA or anchor assembly may further include paired interfacing surfaces 212 and 312, and 214 and 314, each pair of interfacing surfaces offset from one another relative to a given planar direction. For example, surfaces 312 and 212 may engage one another in a given Y-plane in a vehicle (vertically fore/aft sliced plane) while interfacing surfaces 214 and 314 may engage one another in a second, parallel Y-plane. Further positional constraint of anchor assembly 200 may be achieved through interaction with a plurality of positional control interlocking member associated with one or more PCIA's.

While member 318 of PCIA 300 is shown residing in a single position associated with multiple positions of anchor assembly 200, the PCIA member 318 may be rotated from a first to a second position to engage and constrain the position of an anchor assembly 200, wherein the geometry of one or more of elements 318 and interfacing contact surface of anchor assembly 200 are altered to provide a different interfacing configuration.

FIGS. 25A and 25B show an alternative method of engagement between a positional control and interlock member 318 and anchor assembly 200 wherein a gear-like interface is provided such that the position of anchor assembly is controlled more continuously over a range of motion. Such an interface may be provided in association with an anchor assembly and PCIA arrangement including a manual user interface such as a handle, where one or both of the anchor assembly 200 or PCIA assembly 300 incorporate at least one spring to bias rotation of one or both assemblies to a preferred orientation. Alternatively this arrangement may also represent an interface condition associated with a motor driven controller provided to facilitate rotation of one or more anchors in one or more directions. As illustrated in FIG. 25A, surfaces 212 and 312 are shown engage-able, constraining anchor assembly 206 in a first position in one operating condition. As illustrated in FIG. 25B, surfaces 214 and 314 are shown engage-able, constraining anchor assembly 206 in a second position in a second operating condition. Interfacing surface combinations 212/312 and 214/314 may include contact identified by the solid and/or dotted lines of FIGS. 25A and 25B.

FIG. 26 illustrates a positional control and interlock and anchor assembly arrangement 400 where an actuator 410 (such as a motor) is provided to facilitate rotation of one or more child restraint anchor assemblies 402 and/or 402' (for example), or multiple pairs of anchor assemblies, between operational positions. A controller 414 is provided. Positional control and interlock assembly 406 interfaces anchor assembly 402 in a manner such as described in reference to prior figures. A shaft or cross member 408 may be optionally be provided to connect an anchor 402 with anchor 402' and provide a common rotational axis. An interconnect 416 may be provided if the positions of two or more anchors are to be controlled simultaneously. A second positional control and interlock assembly 406' may be provided in a configuration where anchors 402 and 402' are to be controlled together but may not be interconnected by an element such as interconnect 416 or shaft 408. A shaft 408 may be provided to interface a single anchor 402 and a second shaft 408 may be provided to interface anchor 402' or shaft 408 may extend between a plurality of anchors, such as anchor 402 and 402'.

The system for revealing a child restraint anchor according to various embodiments of the disclosed inventive concept may be employed in association with any vehicle seat, structure (the floor, the package tray, the roof, and so forth) mounted child restraint anchor. While specific locations of the CRS anchor have been illustrated in the figures and described in relation thereto, it is to be understood that the CRS anchors may be provided in locations other than those shown and described. The illustrated and described system of revealing a CRS anchor according to the disclosed inventive concept would find application regardless of the location of the CRS anchors.

Further, the generally upright or first positions shown in many figures herein may simply represent a less visible, stowed, concealed, non-CRS use or alterative use anchor orientation. Either or both of the generally depicted upright or more horizontal/reclined anchor positions may reside within a compliant anchor placement zone, for a given market, vehicle type or region where an acceptable anchor zone may be required. While these figures generally depict a lockable reclined anchor position for interfacing a CRS attachment clip, the anchor system may interface a positional control and interlock system where interlocking positional control of an anchor is permitted by locking the position of one or more anchors in either or both of the reference first (or upright) and second (or reclined) anchor positions shown, whether or not a handle is included. For example, the more upright anchor position depicted in many figures (associated with a seatback/seat base interface anchor location) may be less accessible but reside in an acceptable anchor placement zone. In such cases the reclined enhanced access position may represent an interim enhanced accessibility position provided to facilitate improved and perhaps more likely correct CRS attachment, the anchor thereafter retractable by a spring force or an actuator such as a manual handle or motor/solenoid driven means back to a less visible, zone compliant location. This retraction to the less accessible position may correspondingly orient the attached CRS anchor clip and child restraint anchor within a compliant zone while increasing tension and the robustness of the CRS attachment and may further improve finger accessibility for disengagement of various CRS interface clip types. An actuator or release handle could be used to rotate one or more anchors from an upright position into an access position where the handle may be required to be held in position against a return spring tension to provide enhanced accessibility position. Upon releasing the handle the anchor would return to the upright position and securely lock the affected anchor(s) into a preferred "travel-ready" position.

One skilled in the art will readily recognize from such discussion, and from the accompanying drawings and claims that various changes, modifications and variations can be made therein without departing from the true spirit and fair scope of the invention as defined by the following claims.

What is claimed is:

1. A system for anchoring a child safety seat in a vehicle, the system comprising:
   an anchor assembly including a positional control and interlock interfacing surface and a seat anchor movable between stowed and accessible positions; and
   an interlock including an anchor interfacing surface, said anchor engaging said interlock when said anchor is moved to said accessible position and disengaging from said positional control and interlock when said anchor is moved to said stowed position,
   wherein a plurality of positional control interface surfaces are incorporated on said anchor assembly, a plurality of anchor assembly interfacing surfaces are provided on said interlock, wherein engagement between compatible interfacing surfaces of said anchor assembly and said interlock constrain rotation of said anchor assembly in at least one direction for each of two or more anchor positions.

2. A system for anchoring a child safety seat in a vehicle, the system comprising:
   an anchor assembly including a positional control and interlock interfacing surface and a child seat anchor movable between stowed and accessible positions; and
   a positional control and interlock assembly including an anchor interfacing surface, said anchor assembly engaging said positional control and interlock assembly when said anchor is moved to said accessible position and disengaging from said positional control and interlock assembly when said anchor is moved to said stowed position,
   wherein a plurality of positional control interface surfaces are incorporated on said anchor assembly, and a plurality of anchor assembly interfacing surfaces are provided on said positional control and interlock assembly, wherein rotation of said positional control and interlock assembly facilitates anchor assembly rotation as a result of engagement between compatible interfacing surfaces of said anchor assembly and said positional control and interlock assembly.

3. The system for anchoring a child safety seat in a vehicle of claim 2, wherein said anchor assembly includes a spring to urge said anchor assembly to one of said accessible and said stowed positions.

4. The system for anchoring a child safety seat in a vehicle of claim 3, wherein said positional control and interlock assembly is movable between an anchor assembly engaging position and an anchor assembly non-engaging position, said positional control and interlock assembly including a spring to urge said positional control and interlock assembly to one of said anchor assembly engaging and anchor assembly non-engaging positions.

5. A system for anchoring a child safety seat in a vehicle, the system comprising:
   a rotatable anchor assembly including an anchor providing an aperture for connection therewith and at least a first positional control interface surface, together movable between a first position and a second position relative to said first position;
   a positional control and interlock assembly including at least a first anchor assembly interfacing surface, engage-able with said positional control interface surface of said anchor assembly, said anchor assembly engaging said positional control and interlock assembly in at least one of said anchor assembly positions;
   wherein said anchor assembly and said positional control and interlock assembly are carried on structural elements within a vehicle, said structural elements extending from structural members of a vehicle selected from the group consisting of a vehicle seat, a cross member, a floor, a wall, a roof, and a package tray,
   wherein a plurality of positional control interface surfaces are incorporated on said anchor assembly, a plurality of anchor assembly interfacing surfaces are provided on said positional control and interlock assembly, wherein engagement between compatible interfacing surfaces of said anchor assembly and said positional control and interlock assembly constrain rotation of said anchor assembly in any direction for each of two or more anchor positions.

6. The system for anchoring a child safety seat in a vehicle of claim 5, wherein the mounting of said anchor assembly to said structural element is proximate to adjacent vehicle interior trim selected from the group consisting of a vehicle seat base or seatback surface, an interior headliner, a package tray, and plastic trim, wherein at least one of an anchor receiving pocket and an anchor concealing flap are provided for one of said anchor assembly positions, said pocket and said flap formed into, or extending from said interior trim.

7. The system for anchoring a child safety seat in a vehicle of claim 5, wherein a plurality of anchors are interconnected to jointly facilitate simultaneous reorientation of said interconnected anchors between said positions.

8. The system for anchoring a child safety seat in a vehicle of claim 5, wherein said anchor assembly includes a spring to urge said anchor assembly to one of said positions.

9. The system for anchoring a child safety seat in a vehicle of claim 5, wherein a positional control and interlock adjustment axis is provided relative to which said positional control and interlock assembly is moveable, said movement relative to said axis being selected from the group consisting of translational displacement along said axis, pivotal rotation relative to said axis, and a combination of translational displacement along said axis and pivotal rotation relative to said axis.

10. The system of anchoring a child safety seat in a vehicle of claim 5, wherein the orientation of said positional control and interlock assembly is fixable in connection with one of said structural elements, for purposes of constraining rotation of said anchor assembly when said first positional control interface surface of said anchor assembly is engaged with said first anchor assembly interfacing surface of said positional control and interlock assembly.

11. The system for anchoring a child safety seat in a vehicle of claim 5, wherein said positional control and interlock assembly is movable between an anchor assembly engaging position and an anchor assembly non-engaging position.

12. The system for anchoring a child safety seat in a vehicle of claim 11, wherein engagement between said positional control and interlock assembly and said anchor assembly constrains movement of said anchor assembly, preventing said anchor assembly from rotating from one of said anchor assembly positions to the other of said anchor assembly positions.

13. The system for anchoring a child safety seat in a vehicle of claim 5, wherein said anchor assembly is movable between a positional control and interlock assembly engaging position and a positional control and interlock assembly non-engaging position.

14. The system for anchoring a child safety seat in a vehicle of claim 5, further incorporating an adjuster, said adjuster providing control over the position of at least one of said anchor and said positional control and interlock assemblies associated with at least one of said anchor assembly positions, wherein said adjuster may be selected from the group consisting of a handle, lever, knob, motor, and a solenoid.

15. The system for anchoring a child safety seat in a vehicle of claim 14, wherein said positional control and interlock assembly is movable to engage and disengage said anchor assembly, wherein said engagement between said first positional control interface surface of said rotatable anchor assembly and said first anchor assembly interfacing surface of said positional control and interlock assembly preclude said anchor assembly from rotating from engagement with said positional control and interlock assembly without deliberately manipulating or disengaging said positional control and interlock assembly through use of said adjuster.

16. The system for anchoring a child safety seat in a vehicle of claim 5, wherein said positional control and interlock assembly includes a spring to urge said assembly towards one of said anchor engaging and said anchor disengaging positions.

17. The system for anchoring a child safety seat in a vehicle of claim 5, wherein said anchor assembly is mounted to a shaft, wherein said mounting may be comprised of an interface selected from the group consisting of fixedly mounting said anchor assembly to a rotatable shaft engaged with one of said structural elements of the vehicle interior, and pivotally mounting said anchor assembly to a fixed position shaft connected with one of said structural elements of the vehicle interior.

* * * * *